(12) United States Patent
Zhu et al.

(10) Patent No.: US 10,522,170 B2
(45) Date of Patent: Dec. 31, 2019

(54) VOICE ACTIVITY MODIFICATION FRAME ACQUIRING METHOD, AND VOICE ACTIVITY DETECTION METHOD AND APPARATUS

(71) Applicant: ZTE CORPORATION, Shenzhen, Guangdong Province (CN)

(72) Inventors: Changbao Zhu, Shenzhen (CN); Hao Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 23 days.

(21) Appl. No.: 15/577,343

(22) PCT Filed: Nov. 5, 2015

(86) PCT No.: PCT/CN2015/093889
§ 371 (c)(1),
(2) Date: Nov. 28, 2017

(87) PCT Pub. No.: WO2016/206273
PCT Pub. Date: Dec. 29, 2016

(65) Prior Publication Data
US 2018/0158470 A1    Jun. 7, 2018

(30) Foreign Application Priority Data

Jun. 26, 2015  (CN) .......................... 2015 1 0364255

(51) Int. Cl.
*G10L 15/20* (2006.01)
*G10L 25/84* (2013.01)
(Continued)

(52) U.S. Cl.
CPC ............ *G10L 25/84* (2013.01); *G10L 15/063* (2013.01); *G10L 25/18* (2013.01); *G10L 25/60* (2013.01); *G10L 25/81* (2013.01); *G10L 19/012* (2013.01)

(58) Field of Classification Search
CPC ....... G10L 25/78; G10L 19/012; G10L 25/84; G10L 19/173; G10L 19/24; G10L 15/063;
(Continued)

(56) References Cited

U.S. PATENT DOCUMENTS

| | | | |
|---|---|---|---|
| 7,203,638 B2 * | 4/2007 | Jelinek .................. | G10L 19/173 704/201 |
| 8,438,021 B2 * | 5/2013 | Liu ........................ | G10L 25/81 381/110 |

(Continued)

FOREIGN PATENT DOCUMENTS

| | | |
|---|---|---|
| CN | 1473321 A | 2/2004 |
| CN | 101197135 A | 6/2008 |

(Continued)

OTHER PUBLICATIONS

Jongseo Sohn et al., A Voice Activity Detector Employing Soft Decision Based Noise Spectrum Adaptation, Acoustics, Speech and Signal Processing, 1998. Proceedings of the 1998 IEEE International Conference on Seattle, WA, USA May 12-15, 1998, New York, NY, USA, IEEE, US, vol. 1, May 12, 1998 (May 12, 1998), pp. 365-368, XP10279166A.

(Continued)

*Primary Examiner* — Vijay B Chawan
(74) *Attorney, Agent, or Firm* — McDonald Hopkins LLC

(57) ABSTRACT

A method for acquiring the number of modified frames for active sound, and a method and apparatus for voice activity detection are disclosed. Firstly, a first voice activity detection decision result and a second voice activity detection (Continued)

decision result are obtained (501), the number of hangover frames for active sound is obtained (502), and the number of background noise updates is obtained (503), and then the number of modified frames for active sound is calculated according to the first voice activity detection decision result, the number of background noise updates and the number of hangover frames for active sound (504), and finally, a voice activity detection decision result of a current frame is calculated according to the number of modified frames for active sound and the second voice activity detection decision result (505).

20 Claims, 6 Drawing Sheets

(51) Int. Cl.
  *G10L 25/81* (2013.01)
  *G10L 15/06* (2013.01)
  *G10L 25/18* (2013.01)
  *G10L 25/60* (2013.01)
  G10L 19/012 (2013.01)
(58) Field of Classification Search
  CPC ......... G10L 19/02; G10L 19/20; G10L 21/02; G10L 21/0316; G10L 25/51; G10L 19/167; G10L 21/0208; G10L 25/18; G10L 25/60
  USPC ....... 704/233, 226–228, 219, 223, 231, 236, 704/253; 381/110, 71.1; 455/570
  See application file for complete search history.

(56) References Cited

U.S. PATENT DOCUMENTS

| | | | | |
|---|---|---|---|---|
| 8,909,522 | B2* | 12/2014 | Shperling | G10L 25/78 381/71.1 |
| 9,202,476 | B2* | 12/2015 | Sehlstedt | G10L 25/78 |
| 9,240,191 | B2* | 1/2016 | Grancharov | G10L 19/02 |
| 2001/0046843 | A1* | 11/2001 | Alanara | G10L 19/012 455/95 |
| 2002/0116186 | A1* | 8/2002 | Strauss | G10L 25/78 704/233 |
| 2005/0267746 | A1* | 12/2005 | Jelinek | G10L 19/173 704/226 |
| 2010/0223053 | A1* | 9/2010 | Sandgren | G10L 19/012 704/219 |
| 2011/0066429 | A1* | 3/2011 | Shperling | G10L 25/78 704/228 |
| 2012/0095760 | A1* | 4/2012 | Ojala | G10L 19/24 704/228 |
| 2012/0232896 | A1* | 9/2012 | Taleb | G10L 25/78 704/233 |
| 2013/0054236 | A1* | 2/2013 | Garcia Martinez | G10L 25/78 704/233 |
| 2014/0046658 | A1* | 2/2014 | Grancharov | G10L 25/78 704/208 |
| 2016/0078884 | A1* | 3/2016 | Sehlstedt | G10L 25/78 704/233 |

FOREIGN PATENT DOCUMENTS

| | | |
|---|---|---|
| CN | 101320559 A | 12/2008 |
| CN | 101399039 A | 4/2009 |
| CN | 101841587 A | 9/2010 |
| CN | 102687196 A | 9/2012 |
| CN | 102693720 A | 9/2012 |
| CN | 103903634 A | 7/2014 |
| CN | 104424956 A | 3/2015 |
| EP | 3316256 A1 | 5/2018 |
| JP | H05130067 | 5/1993 |
| JP | 2006194959 | 7/2006 |
| JP | 2013160937 | 8/2013 |
| WO | 2004111996 | 7/2006 |
| WO | 2007091956 A2 | 8/2007 |
| WO | WO2012146290 A1 | 11/2012 |
| WO | 2016206273 A1 | 12/2016 |
| WO | 2015029545 | 3/2017 |

OTHER PUBLICATIONS

3rd Generation Partnership Project; Technical Specification Group Services and System Aspects; Mandatory speech codec speech processing functions; Adaptive Multi-Rate(AMR) speech codec; Voice Activity Detector (VAD) (Release 6), 3GPP TS 26.094 V6.0.0(Dec. 2004). XP50369746A.

Japan Patent Office (JPO), Notice of Reasons for Refusal for Patent Application No. 2017-566850, dated Oct. 22, 2018, Fourth Patent Examination Department, Japan.

* cited by examiner

VOICE ACTIVITY MODIFICATION FRAME ACQUIRING METHOD, AND VOICE ACTIVITY DETECTION METHOD AND APPARATUS

TECHNICAL FIELD

The present application relates to, but is not limited to, the field of communications.

BACKGROUND

In normal voice calls, a user sometimes speaks and sometimes listens. At this time, an inactive speech phase may appear in the call process. In normal cases, a total inactive speech phase of both parties in a call exceeds 50% of a total time length of voice coding of the two parties of the call. In the non-active speech phase, there is only a background noise, and there is generally no useful information in the background noise. With this fact, in the process of voice signal processing, an active speech and a non-active speech are detected through a Voice Activity Detection (VAD for short) algorithm and are processed using different methods respectively. Many voice coding standards, such as Adaptive Multi-Rate (AMR) and Adaptive Multi-Rate Wideband (AMR-WB for short), support the VAD function. In terms of efficiency, the VAD of these encoders cannot achieve good performance under all typical background noises. Especially in an unstable noise, these encoders have low VAD efficiency. For music signals, the VAD sometimes has error detection, resulting in significant quality degradation of the corresponding processing algorithm.

SUMMARY

The following is an overview of the subjects which are described in detail herein. This overview is not intended to limit the protection scope of the claims.

The embodiments of the present disclosure provide a method for acquiring a number of modified frames for active sound and a method and apparatus for voice activity detection (VAD), to solve the problem of low accuracy for the voice activity detection.

The embodiments of the present disclosure provide a method for acquiring a number of modified frames for active sound, including:

acquiring a voice activity detection, VAD, decision result of a current frame;

acquiring a number of hangover frames for active sound;

acquiring a number of background noise updates; and acquiring the number of modified frames for active sound according to the voice activity detection decision result of the current frame, the number of background noise updates and the number of hangover frames for active sound.

In an exemplary embodiment, acquiring a voice activity detection decision result of a current frame includes:

acquiring a sub-band signal and a spectrum amplitude of the current frame;

calculating a frame energy parameter, a spectral centroid feature and a time-domain stability feature of the current frame according to the sub-band signals; and calculating a spectral flatness feature and a tonality feature according to the spectrum amplitudes;

calculating a signal-to-noise ratio, SNR, parameter of the current frame according to background noise energy estimated from a previous frame, the frame energy parameter and energy of SNR sub-bands of the current frame;

calculating a tonality signal flag of the current frame according to the frame energy parameter, the spectral centroid feature, the time-domain stability feature, the spectral flatness feature, and the tonality feature; and calculating the VAD decision result according to the tonality signal flag, the SNR parameter, the spectral centroid feature, and the frame energy parameter.

In an exemplary embodiment, the frame energy parameter is a weighted cumulative value or a direct cumulative value of energy of various sub-band signals;

the spectral centroid feature is a ratio of a weighted cumulative value and an unweighted cumulative value of the energy of all or a part of the sub-band signals, or is a value obtained by performing smooth filtering on the ratio;

the time-domain stability feature is a desired ratio of a variance of the amplitude cumulative values and a square of the amplitude cumulative values, or is a product of the ratio and a coefficient;

the spectral flatness feature is a ratio of a geometric mean and an arithmetic mean of a predetermined plurality of smoothed spectrum amplitudes, or is a product of the ratio and a coefficient; and the tonality feature is obtained by calculating a correlation value of intra-frame spectral difference coefficients of two adjacent frame signals, or is obtained by continuing to perform smooth filtering on the correlation value.

In an exemplary embodiment, calculating the voice activity detection decision result according to the tonality signal flag, the SNR parameter, the spectral centroid feature, and the frame energy parameter includes:

acquiring a long-time SNR by computing a ratio of average energy of long-time active frames to average energy of long-time background noise for the previous frame;

acquiring an average total SNR of all sub-bands by calculating an average value of SNR of all sub-bands for a plurality of frames closest to the current frame;

acquiring an SNR threshold for making VAD decision according to the spectral centroid feature, the long-time SNR, the number of continuous active frames and the number of continuous noise frames;

acquiring an initial VAD decision according to the SNR threshold for VAD and the SNR parameter; and acquiring the VAD decision result by updating the initial VAD decision according to the tonality signal flag, the average total SNR of all sub-bands, the spectral centroid feature, and the long-time SNR.

In an exemplary embodiment, acquiring the number of modified frames for active sound according to the voice activity detection decision result of the current frame, the number of background noise updates and the number of hangover frames for active sound includes:

when the VAD decision result indicates the current frame is an active frame and the number of background noise updates is less than a preset threshold, the number of modified frames for active sound is selected as a maximum value of a constant and the number of hangover frames for active sound.

In an exemplary embodiment, obtaining the number of hangover frames for active sound includes:

setting an initial value of the number of hangover frames for active sound.

In an exemplary embodiment, acquiring the number of hangover frames for active sound includes:

acquiring a sub-band signal and a spectrum amplitude of the current frame;

calculating a long-time SNR and an average total SNR of all sub-bands according to the sub-band signal, and obtaining the number of hangover frames for active sound by updating the current number of hangover frames for active sound according to the VAD decision results of a plurality of previous frames, the long-time SNR, the average total SNR of all sub-bands, and the VAD decision result of the current frame.

In an exemplary embodiment, calculating a long-time SNR and an average total SNR of all sub-bands according to the sub-band signal includes:

calculating the long-time SNR through the ratio of the average energy of long-time active frames and the average energy of long-time background noise calculated by using the previous frame of the current frame; and calculating an average value of SNRs of all sub-bands of a plurality of frames closest to the current frame to obtain the average total SNR of all sub-bands.

In an exemplary embodiment, a precondition for modifying the current number of hangover frames for active sound is that a voice activity detection flag indicates that the current frame is an active frame.

In an exemplary embodiment, updating the current number of hangover frames for active sound to acquire the number of hangover frames for active sound includes:

when acquiring the number of hangover frames for active sound, if a number of continuous active frames is less than a set first threshold and the long-time SNR is less than a set threshold, the number of hangover frames for active sound is updated by subtracting the number of continuous active frames from the minimum number of continuous active frames; and if the average total SNR of all sub-bands is greater than a set threshold and the number of continuous active frames is greater than a set second threshold, setting a value of the number of hangover frames for active sound according to the value of the long-time SNR.

In an exemplary embodiment, acquiring a number of background noise updates includes:

acquiring a background noise update flag; and calculating the number of background noise updates according to the background noise update flag.

In an exemplary embodiment, calculating the number of background noise updates according to the background noise update flag includes:

setting an initial value of the number of background noise updates.

In an exemplary embodiment, calculating the number of background noise updates according to the background noise update flag includes:

when the background noise update flag indicates that a current frame is a background noise and the number of background noise updates is less than a set threshold, adding the number of background noise updates by 1.

In an exemplary embodiment, acquiring a background noise update flag includes:

acquiring a sub-band signal and a spectrum amplitude of the current frame;

calculating a frame energy parameter, a spectral centroid feature and a time-domain stability feature according to the sub-band signal; and calculating a spectral flatness feature and a tonality feature according to the spectrum amplitude; and performing background noise detection according to the spectral centroid feature, the time-domain stability feature, the spectral flatness feature, the tonality feature, and the frame energy parameter to acquire the background noise update flag.

In an exemplary embodiment, the frame energy parameter is a weighted cumulative value or a direct cumulative value of energy of various sub-band signals;

the spectral centroid feature is a ratio of a weighted cumulative value and an unweighted cumulative value of the energy of all or a part of the sub-band signals, or is a value obtained by performing smooth filtering on the ratio;

the time-domain stability feature is a desired ratio of a variance of the frame energy amplitudes and a square of the amplitude cumulative values, or is a product of the ratio and a coefficient; and the spectral flatness parameter is a ratio of a geometric mean and an arithmetic mean of a predetermined plurality of spectrum amplitudes, or is a product of the ratio and a coefficient.

In an exemplary embodiment, performing background noise detection according to the spectral centroid feature, the time-domain stability feature, the spectral flatness feature, the tonality feature, and the frame energy parameter to acquire the background noise update flag includes:

setting the background noise update flag as a first preset value;

determining that the current frame is not a noise signal and setting the background noise update flag as a second preset value if any of the following conditions is true:

the time-domain stability feature is greater than a set threshold;

a smooth filtered value of the spectral centroid feature value is greater than a set threshold, and a value of the time-domain stability feature is also greater than a set threshold;

a value of the tonality feature or a smooth filtered value of the tonality feature is greater than a set threshold, and a value of the time-domain stability feature is greater than a set threshold;

a value of a spectral flatness feature of each sub-band or a smooth filtered value of the spectral flatness feature of each sub-band is less than a respective corresponding set threshold; or a value of the frame energy parameter is greater than a set threshold.

The embodiments of the present disclosure provide a method for voice activity detection, including:

acquiring a first voice activity detection decision result;

acquiring a number of hangover frames for active sound;

acquiring a number of background noise updates;

calculating a number of modified frames for active sound according to the first voice activity detection decision result, the number of background noise updates, and the number of hangover frames for active sound;

acquiring a second voice activity detection decision result; and calculating the voice activity detection decision result according to the number of modified frames for active sound and the second voice activity detection decision result.

In an exemplary embodiment, calculating the voice activity detection decision result according to the number of modified frames for active sound and the second voice activity detection decision result includes:

when the second voice activity detection decision result indicates that the current frame is an inactive frame and the number of modified frames for active sound is greater than 0, setting the voice activity detection decision result as an active frame, and reducing the number of modified frames for active sound by 1.

In an exemplary embodiment, acquiring a first voice activity detection decision result includes:

acquiring a sub-band signal and a spectrum amplitude of a current frame;

calculating a frame energy parameter, a spectral centroid feature and a time-domain stability feature of the current frame according to the sub-band signal; and calculating a spectral flatness feature and a tonality feature according to the spectrum amplitude;

calculating a signal-to-noise ratio parameter of the current frame according to background noise energy acquired from a previous frame, the frame energy parameter and signal-to-noise ratio sub-band energy;

calculating a tonality signal flag of the current frame according to the frame energy parameter, the spectral centroid feature, the time-domain stability feature, the spectral flatness feature, and the tonality feature; and calculating the first voice activity detection decision result according to the tonality signal flag, the signal-to-noise ratio parameter, the spectral centroid feature, and the frame energy parameter.

In an exemplary embodiment, the frame energy parameter is a weighted cumulative value or a direct cumulative value of energy of various sub-band signals;

the spectral centroid feature is a ratio of a weighted cumulative value and an unweighted cumulative value of the energy of all or a part of the sub-band signals, or is a value obtained by performing smooth filtering on the ratio;

the time-domain stability feature is a desired ratio of a variance of the amplitude cumulative values and a square of the amplitude cumulative values, or is a product of the ratio and a coefficient;

the spectral flatness feature is a ratio of a geometric mean and an arithmetic mean of a predetermined plurality of spectrum amplitudes, or is a product of the ratio and a coefficient; and the tonality feature is obtained by calculating a correlation value of intra-frame spectral difference coefficients of two adjacent frame signals, or is obtained by continuing to perform smooth filtering on the correlation value.

In an exemplary embodiment, calculating the first voice activity detection decision result according to the tonality signal flag, the signal-to-noise ratio parameter, the spectral centroid feature, and the frame energy parameter includes:

calculating a long-time SNR through a ratio of average energy of long-time active frames and average energy of long-time background noise calculated at the previous frame;

calculating an average value of SNRs of all sub-bands of a plurality of frames closest to the current frame to acquire an average total SNR of all sub-bands;

acquiring a voice activity detection decision threshold according to the spectral centroid feature, the long-time SNR, the number of continuous active frames and the number of continuous noise frames;

calculating an initial voice activity detection decision result according to the voice activity detection decision threshold and the signal-to-noise ratio parameter; and modifying the initial voice activity detection decision result according to the tonality signal flag, the average total SNR of all sub-bands, the spectral centroid feature, and the long-time SNR to acquire the first voice activity detection decision result.

In an exemplary embodiment, obtaining the number of hangover frames for active sound includes:

setting an initial value of the number of hangover frames for active sound.

In an exemplary embodiment, acquiring the number of hangover frames for active sound includes:

acquiring a sub-band signal and a spectrum amplitude of a current frame; and calculating a long-time SNR and an average total SNR of all sub-bands according to the sub-band signals, and modifying the current number of hangover frames for active sound according to voice activity detection decision results of a plurality of previous frames, the long-time SNR, the average total SNR of all sub-bands, and the first voice activity detection decision result.

In an exemplary embodiment, calculating a long-time SNR and an average total SNR of all sub-bands according to the sub-band signal includes:

calculating the long-time SNR through the ratio of the average energy of long-time active frames and the average energy of long-time background noise calculated by using the previous frame of the current frame; and calculating an average value of SNRs of all sub-bands of a plurality of frames closest to the current frame to acquire the average total SNR of all sub-bands.

In an exemplary embodiment, a precondition for correcting the current number of hangover frames for active sound is that a voice activity flag indicates that the current frame is an active frame.

In an exemplary embodiment, modifying the current number of hangover frames for active sound includes:

if the number of continuous voice frames is less than a set first threshold and the long-time SNR is less than a set threshold, the number of hangover frames for active sound being equal to a minimum number of continuous active frames minus the number of continuous active frames; and if the average total SNR of all sub-bands is greater than a set second threshold and the number of continuous active frames is greater than a set threshold, setting a value of the number of hangover frames for active sound according to a size of the long-time SNR.

In an exemplary embodiment, acquiring a number of background noise updates includes:

acquiring a background noise update flag; and calculating the number of background noise updates according to the background noise update flag.

In an exemplary embodiment, calculating the number of background noise updates according to the background noise update flag includes:

setting an initial value of the number of background noise updates.

In an exemplary embodiment, calculating the number of background noise updates according to the background noise update flag includes:

when the background noise update flag indicates that a current frame is a background noise and the number of background noise updates is less than a set threshold, adding the number of background noise updates by 1.

In an exemplary embodiment, acquiring a background noise update flag includes:

acquiring a sub-band signal and a spectrum amplitude of a current frame;

calculating values of a frame energy parameter, a spectral centroid feature and a time-domain stability feature according to the sub-band signal; and calculating values of a spectral flatness feature and a tonality feature according to the spectrum amplitude; and performing background noise detection according to the spectral centroid feature, the time-domain stability feature, the spectral flatness feature, the tonality feature, and the frame energy parameter to acquire the background noise update flag.

In an exemplary embodiment, the frame energy parameter is a weighted cumulative value or a direct cumulative value of energy of various sub-band signals;

the spectral centroid feature is a ratio of a weighted cumulative value and an unweighted cumulative value of the energy of all or a part of the sub-band signals, or is a value obtained by performing smooth filtering on the ratio;

the time-domain stability feature is a desired ratio of a variance of the frame energy amplitudes and a square of the amplitude cumulative values, or is a product of the ratio and a coefficient; and the spectral flatness parameter is a ratio of a geometric mean and an arithmetic mean of a predetermined plurality of spectrum amplitudes, or is a product of the ratio and a coefficient.

In an exemplary embodiment, performing background noise detection according to the spectral centroid feature, the time-domain stability feature, the spectral flatness feature, the tonality feature, and the frame energy parameter to acquire the background noise update flag includes:

setting the background noise update flag as a first preset value;

determining that the current frame is not a noise signal and setting the background noise update flag as a second preset value if any of the following conditions is true:

the time-domain stability feature is greater than a set threshold;

a smooth filtered value of the spectral centroid feature value is greater than a set threshold, and a value of the time-domain stability feature is also greater than a set threshold;

a value of the tonality feature or a smooth filtered value of the tonality feature is greater than a set threshold, and a value of the time-domain stability feature is greater than a set threshold;

a value of a spectral flatness feature of each sub-band or a smooth filtered value of the spectral flatness feature of each sub-band is less than a respective corresponding set threshold; or a value of the frame energy parameter is greater than a set threshold.

In an exemplary embodiment, calculating the number of modified frames for active sound according to the first voice activity detection decision result, the number of background noise updates and the number of hangover frames for active sound includes:

when the first voice activity detection decision result is an active frame and the number of background noise updates is less than a preset threshold, the number of modified frames for active sound being a maximum value of a constant and the number of hangover frames for active sound.

The embodiments of the present disclosure provide an apparatus for acquiring a number of modified frames for active sound, including:

a first acquisition unit arranged to acquire a voice activity detection decision result of a current frame;

a second acquisition unit arranged to acquire a number of hangover frames for active sound;

a third acquisition unit arranged to acquire a number of background noise updates; and a fourth acquisition unit arranged to acquire the number of modified frames for active sound according to the voice activity detection decision result of the current frame, the number of background noise updates and the number of hangover frames for active sound.

The embodiments of the present disclosure provide an apparatus for voice activity detection, including:

a fifth acquisition unit arranged to acquire a first voice activity detection decision result;

a sixth acquisition unit arranged to acquire a number of hangover frames for active sound;

a seventh acquisition unit arranged to acquire a number of background noise updates;

a first calculation unit arranged to calculate a number of modified frames for active sound according to the first voice activity detection decision result, the number of background noise updates, and the number of hangover frames for active sound;

an eighth acquisition unit arranged to acquire a second voice activity detection decision result; and a second calculation unit arranged to calculate the voice activity detection decision result according to the number of modified frames for active sound and the second voice activity detection decision result.

A computer readable storage medium, has computer executable instructions stored thereon for performing any of the methods as described above.

The embodiments of the present disclosure provide a method for acquiring a number of modified frames for active sound, and a method and apparatus for voice activity detection. Firstly, a first voice activity detection decision result is obtained, a number of hangover frames for active sound is obtained, and a number of background noise updates is obtained, and then a number of modified frames for active sound is calculated according to the first voice activity detection decision result, the number of background noise updates and the number of hangover frames for active sound, and a second voice activity detection decision result is obtained, and finally, the voice activity detection decision result is calculated according to the number of modified frames for active sound and the second voice activity detection decision result, which can improve the detection accuracy of the VAD.

After reading and understanding the accompanying drawings and detailed description, other aspects can be understood.

DETAILED DESCRIPTION

The embodiments of the present disclosure will be described in detail below with reference to the accompanying drawings. It is to be illustrated that the embodiments in the present application and features in the embodiments can be combined with each other randomly without conflict.

The steps shown in the flowchart of the accompanying drawings can be performed in a computer system such as a set of computer-executable instructions. Further, although a logical order is shown in the flowchart, in some cases, the steps shown or described can be performed in an order different from that described here.

Symbol description: without special description, in the following embodiments, a right superscript [i] represents a frame serial number, [0] represents a current frame, and [−1] represents a previous frame. For example, $A_{ssp}^{[0]}(i)$ and $A_{ssp}^{[−1]}(i)$ represent smoothed spectrums of the current frame and the previous frame.

Embodiment One

Figure 1:
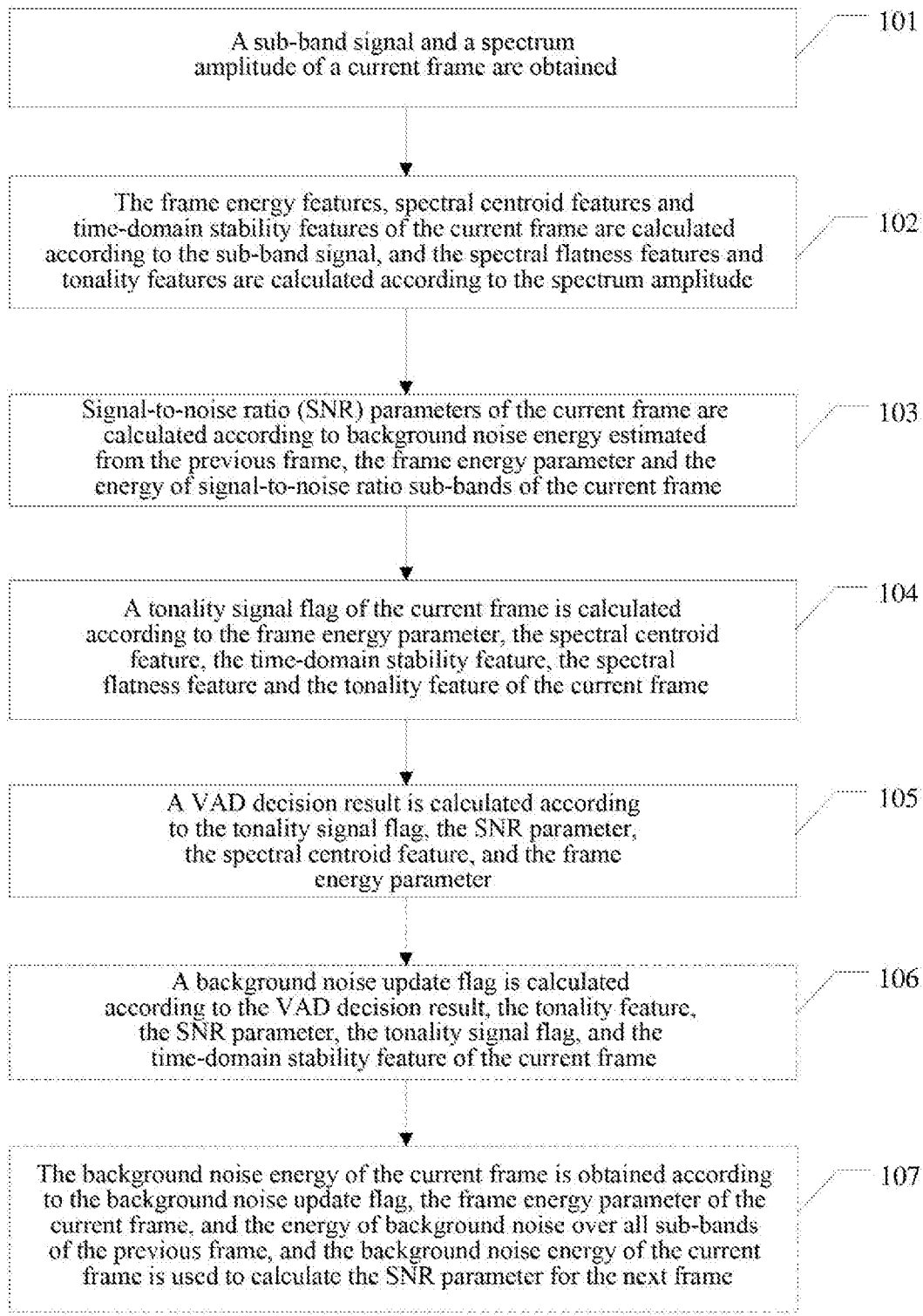
FIG. 1 is a flowchart of a method for voice activity detection according to embodiment one of the present disclosure.

The embodiment of the present disclosure provides a method for voice activity detection, as shown in FIG. 1, including the following steps.

In step 101, a sub-band signal and a spectrum amplitude of a current frame are obtained.

The present embodiment is described by taking an audio stream with a frame length of 20 ms and a sampling rate of 32 kHz as an example. In conditions with other frame lengths and sampling rates, the method herein is also applicable.

A time domain signal of the current frame is input into a filter bank, to perform sub-band filtering calculation so as to obtain a sub-band signal of the filter bank;

In this embodiment, a 40-channel filter bank is used, and the method herein is also applicable to filter banks with other numbers of channels. It is assumed that the input audio signal is $s_{HP}(n)$, $L_C$ is 40, which is the number of channels of the filter bank, $w_C$ is a window function with a window length of 10 $L_C$, and the sub-band signal is $X(k,l)=X_{CR}(l,k)+i \cdot X_{CI}(l,k)$, herein $X_{CR}$ and $X_{CI}$ are the real and the imaginary parts of the sub-band signal. A calculation method for the sub-band signal is as follows:

$$X_{CR}(l, k) = \sqrt{\frac{80}{L_c}} \cdot \sum_{n=0}^{n=10L_C} -w_C(10Lc - n) \cdot s_{HP}(10Lc - n + l \cdot L_C)$$
$$\cos\left[\frac{\pi}{L_C}\left(n + \frac{1}{2} + \frac{L_C}{2}\right)\left(k + \frac{1}{2}\right)\right]$$

$$X_{CI}(l, k) = \sqrt{\frac{80}{L_c}} \cdot \sum_{n=0}^{n=10L_C} -w_C(10Lc - n) \cdot s_{HP}(10Lc - n + l \cdot L_C)$$
$$\sin\left[\frac{\pi}{L_C}\left(n + \frac{1}{2} + \frac{L_C}{2}\right)\left(k + \frac{1}{2}\right)\right].$$

Herein l is a sub-band time index and $0 \le l \le 15$, k is a sub-band index with $0 \le k \le L_C - 1$.

Time-frequency transform is performed on the sub-band signal of the filter bank and the spectrum amplitude is calculated.

Herein, the embodiment of the present disclosure can be realized by performing time-frequency transform on all the sub-bands of the filter bank or a part of the sub-bands of the filter bank, and calculating the spectrum amplitude. The time-frequency transform method according to the embodiment of the present disclosure may be Discrete Fourier Transform (DFT for short), Fast Fourier Transformation (FFT for short), Discrete Cosine Transform (DCT for short) or Discrete Sine Transform (DST for short). This embodiment uses the DFT as an example to illustrate its implementation method. A calculation process is as follows.

A 16-point DFT transform is performed on data of 16 time sample points on each of the sub-band of the filter bank with indexes of 0 to 9, to further improve the spectral resolution and calculate the amplitude at each frequency point so as to obtain the spectrum amplitude $A_{sp}$.

A calculation equation of the time-frequency transform is as follows:

$$X_{DFT}[k, j] = \sum_{l=0}^{15} X[k, l] e^{-\frac{2\pi i}{16} j l}; \, 0 \le k < 10, \, 0 \le j < 16.$$

A calculation process of the amplitude at each frequency point is as follows.

Firstly, energy of an array $X_{DFT}[k, j]$ at each point is calculated, and a calculation equation as follows.

$$X_{DFT\_POW}[k,j] = ((\text{Re}(X_{DFT}[k,j]))^2 + (\text{Im}(X_{DFT}[k,j]))^2);$$
$$0 \le k < 10, 0 \le j < 16$$

Herein, $\text{Re}(X_{DFT}[k, j])$ and $\text{Im}(X_{DFT}[k, j])$ represent the real and the imaginary parts of the spectral coefficients $X_{DFT}[k, j]$ respectively.

If k is an even number, the following equation is used to calculate the spectrum amplitude at each frequency point:

$$A_{sp}(8k+j) = \sqrt{X_{DFT\_POW}[k,j] + X_{DFT\_POW}[k,15-j]},$$
$$0 \le k < 10, 0 \le j < 8$$

If k is an odd number, the following equation is used to calculate the spectrum amplitude at each frequency point:

$$A_{sp}(8k+7-j) = \sqrt{X_{DFT\_POW}[k,j] + X_{DFT\_POW}[k,15-j]},$$
$$0 \le k < 10, 0 \le j < 8$$

$A_{sp}$ is the spectrum amplitude after the time-frequency transform is performed.

In step 102, The frame energy features, spectral centroid features and time-domain stability features of the current frame are calculated according to the sub-band signal, and the spectral flatness features and tonality features are calculated according to the spectrum amplitude.

Herein the frame energy parameter is a weighted cumulative value or a direct cumulative value of energy of all sub-band signals, herein:

a) energy $E_{sb}[k] = \overline{E}c(k)$ of each sub-band of the filter bank is calculated according to the sub-band signal $X[k,l]$ of the filter bank:

$$\overline{E}c(k) = \sum_{t=0}^{15} E_C(t,k) \, 0 \le k \le L_C - 1$$

Herein, $E_C(t,k) = (X_{CR}(t,k))^2 + (X_{CI}(t,k))^2 \, 0 \le t \le 15, \, 0 \le k \le L_C - 1$.

b) Energy of a part of the sub-bands of the filter bank which are acoustically sensitive or energy of all the sub-bands of the filter bank are cumulated to obtain the frame energy parameter.

Herein, according to a psychoacoustic model, the human ear is less sensitive to sound at very low frequencies (for example, below 100 Hz) and high frequencies (for example, above 20 kHz). For example, in the embodiment of the present disclosure, it is considered that among the sub-bands of the filter bank which are arranged in an order from low frequency to high frequency, the second sub-band to the last but one sub-band are primary sub-bands of the filter bank which are acoustically sensitive, energy of a part or all of the sub-bands of the filter bank which are acoustically sensitive is cumulated to obtain a frame energy parameter 1, and a calculation equation is as follows:

$$E_{t1} = \sum_{k=e\_sb\_start}^{e\_sb\_end} \overline{E}_C(k).$$

Herein, e_sb_start is a start sub-band index, with a value range of [0,6]. e_sb_end is an end sub-band index, with a value greater than 6 and less than the total number of the sub-bands.

A value of the frame energy parameter 1 is added to a weighted value of the energy of a part or all of sub-bands of the filter bank which are not used when the frame energy parameter 1 is calculated to obtain a frame energy parameter 2, and a calculation equation thereof is as follows:

$$E_{t2} = E_{t1} + e\_scale1 \cdot \sum_{k=0}^{e\_sb\_start-1} \overline{E}_C(k) + e\_scale2 \cdot \sum_{k=e\_sb\_end+1}^{num\_band} \overline{E}_C(k)$$

herein e_scale1 and e_scale2 are weighted scale factors with value ranges of [0,1] respectively, and num_band is the total number of sub-bands.

The spectral centroid features are the ratio of the weighted sum to the non-weighted sum of energies of all sub-bands or partial sub-bands, herein:

The spectral centroid features are calculated according to the energies of sub-bands of the filter bank. A spectral centroid feature is the ratio of the weighted sum to the non-weighted sum of energies of all or partial sub-bands, or the value is obtained by applying smooth filtering to this ratio.

The spectral centroid features can be obtained by the following sub-steps:

a: A sub-band division for calculating the spectral centroid features is as follows.

| Spectral centroid feature number | Spectral centroid feature start sub-band index spc_start_band | Spectral centroid feature end sub-band index spc_end_band |
|---|---|---|
| 0 | 0 | 10 |
| 1 | 1 | 24 | b: values of two spectral centroid features, which are a first interval spectral centroid feature and a second interval spectral centroid feature, are calculated using the interval division manner for the calculation of the spectral centroid feature in a and the following equation.

$$sp\_center[k] = \frac{\sum_{n=0}^{spc\_end\_band(k)-spc\_start\_band(k)} (n+1) \cdot E_{sb}[n + spc\_start\_band(k)] + Delta1}{\sum_{n=0}^{spc\_end\_band(k)-spc\_start\_band(k)} E_{sb}[n + spc\_start\_band(k)] + Delta2};$$

$$0 \leq k < 2$$

Delta1 and Delta2 are small offset values respectively, with a value range of (0,1). Herein, k is a spectral centroid feature number.

c: a smooth filtering operation is performed on the first interval spectral centroid feature sp_center[0] to obtain a smoothed value of the spectral centroid feature, that is, a smooth filtered value of the first interval spectral centroid feature, and a calculation process is as follows:

$$sp\_center[2] = sp\_center_{-1}[2] \bullet spc\_sm\_scale + sp\_center[0] \bullet (1 - spc\_sm\_scale)$$

Herein, spc_sm_scale is a smooth filtering scale factor of the spectral centroid feature, and $sp\_center_{-1}[2]$ represents the smoothed value of spectral centroid feature in the previous frame, with an initial value of 1.6.

The time-domain stability feature is the ratio of the variance of the sums of energy amplitudes to the expectation of the squared sum of energy amplitudes, or the ratio multiplied by a factor, herein:

The time-domain stability features are computed with the energy features of the most recent several frames. In the present embodiment, the time-domain stability feature is calculated using frame energies of 40 latest frames. The calculation steps are as follows.

Firstly, the energy amplitudes of the 40 latest frame signals are calculated, and a calculation equation is as follows:

$$Amp_{t1}[n] = \sqrt{E_{t2}(n)} + e\_offset; \quad 0 \leq n < 40;$$

Herein, e_offset is an offset value, with a value range of [0, 0.1].

Next, by adding together the energy amplitudes of two adjacent frames from the current frame to the $40^{th}$ previous frame, 20 sums of energy amplitudes are obtained. A calculation equation is as follows:

$$Amp_{t2}(n) = Amp_{t1}(-2n) + Amp_{t1}(-2n-1); \quad 0 \leq n < 20;$$

Herein, when n=0, $Amp_{t1}$ represents an energy amplitude of the current frame, and when n<0, $Amp_{t1}$ represents the energy amplitude of the $n^{th}$ previous frame from the current frame.

Finally, the time-domain stability feature ltd_stable_rate0 is obtained by calculating the ratio of the variance to the average energy of the 20 sums of amplitudes closet to the current frame. A calculation equation is as follows:

$$ltd\_stable\_rate0 = \frac{\sum_{n=0}^{19}\left(Amp_{t2}(n) - \frac{1}{20}\sum_{j=0}^{19} Amp_{t2}(j)\right)^2}{\sum_{n=0}^{19} Amp_{t2}(n)^2 + Delta};$$

Spectral flatness feature is the ratio of the geometric mean to the arithmetic mean of smoothed spectrum amplitude, or the ratio multiplied by a factor.

The spectrum amplitude is smoothed to obtain:

$$A_{ssp}^{[0]}(i)=0.7A_{ssp}^{[-1]}(i)+0.3A_{ssp}^{[0]}(i), 0 \le i < N_A$$

Herein, $A_{ssp}^{[0]}(i)$ and $A_{ssp}^{[-1]}(i)$ represent the smoothed spectrum amplitudes of the current frame and the previous frame, respectively, and $N_A$ is the number of the spectrum amplitudes.

It is to be illustrated that the predetermined several spectrum amplitudes described in the embodiment of the present disclosure may be partial of the spectrum amplitudes selected according to the experience of those skilled in the art or may also be a part of the spectrum amplitudes selected according to practical situations.

In this embodiment, the spectrum amplitude is divided into three frequency regions, and the spectral flatness features are computed for these frequency regions. A division manner thereof is as follows.

Sub-band division for computing spectral flatness features

| Spectral flatness number (k) | $N_{A\_start}$ (k) | $N_{A\_end}$ (k) |
|---|---|---|
| 0 | 5 | 19 |
| 1 | 20 | 39 |
| 2 | 40 | 64 |

Let $N(k)=N_{A\_end}(k)-N_{A\_start}(k)+1$ represent the number of spectrum amplitudes used to calculate the spectral flatness features, $F_{SF}(k)$:

$$F_{SF}(k) = \frac{\left(\prod_{n=N_{A\_start}(k)}^{N_{A\_end}(k)} A_{ssp}(n)\right)^{1/N(k)}}{\left(\sum_{n=N_{A\_start}(k)}^{N_{A\_end}(k)} A_{ssp}(n)\right)/N(k)}$$

Finally, the spectral flatness features of the current frame are smoothed to obtain final spectral flatness features of the current frame:

$$F_{SSF}^{[0]}(k)=0.85F_{SSF}^{[-1]}(k)+0.15F_{SF}^{[0]}(k).$$

Herein, $F_{SSF}^{[0]}(k)$ and $F_{SSF}^{[-1]}(k)$ are the smoothed spectral flatness features of the current frame and the previous frame, respectively.

The tonality features are obtained by computing the correlation coefficient of the intra-frame spectrum amplitude difference of two adjacent frames, or obtained by further smoothing the correlation coefficient.

A calculation method of the correlation coefficient of the intra-frame spectrum amplitude differences of the two adjacent frame signals is as follows.

The tonality feature is calculated according to the spectrum amplitude, herein the tonality feature may be calculated according to all the spectrum amplitudes or a part of the spectrum amplitudes.

The calculation steps are as follows.

a): Spectrum-amplitude differences of two adjacent spectrum amplitudes are computed for partial (not less than 8 spectrum amplitudes) or all spectrum amplitudes in the current frame. If the difference is smaller than 0, set it to 0, and a group of non-negative spectrum-amplitude differences is obtained:

$$D_{sp}(i) = \begin{cases} 0 & \text{if } A_{sp}(i+6) < A_{sp}(i+5) \\ A_{sp}(i+6) - A_{sp}(i+5) & \text{otherwise} \end{cases}$$

b): The correlation coefficient between the non-negative spectrum-amplitude differences of the current frame obtained in Step a) and the non-negative spectrum-amplitude differences of the previous frame is computed to obtain the first tonality feature as follows:

$$F_{TR} = \frac{\sum_{i=0}^{N} D_{sp}^{[0]}(i) D_{sp}^{[-1]}(i)}{\sqrt{\sum_{i=0}^{N} (D_{sp}^{[0]}(i))^2 (D_{sp}^{[-1]}(i))^2}}.$$

Herein, $D_{sp}^{[-1]}(i)$ is a non-negative spectrum-amplitude difference of the previous frame.

c): The first tonality feature is smoothed to obtain the value of second tonality feature $F_T^{[0]}(1)$ and the third tonality feature $F_T^{[0]}(2)$, herein a corner mark 0 represents the current frame, and the calculation equation is as follows:

$$F_T(0)=F_{TR}$$

$$F_T^{[0]}(1)=0.964F_T^{[-1]}(1)+0.04F_{TR}.$$

$$F_T^{[0]}(2)=0.90F_T^{[-1]}(2)+0.10F_{TR}$$

In step 103, signal-to-noise ratio (SNR) parameters of the current frame are calculated according to background noise energy estimated from the previous frame, the frame energy parameter and the energy of signal-to-noise ratio sub-bands of the current frame.

The background noise energy of the previous frame may be obtained using an existing method.

If the current frame is a start frame, a default initial value is used as background noise energy of SNR sub-bands. In principle, the estimation of background noise energy of the SNR sub-bands of the previous frame is the same as that of the current frame. The estimation of the background energy of SNR sub-bands of the current frame can be known with reference to step 107 of the present embodiment. Herein, the SNR parameters of the current frame can be achieved using an existing method. Alternatively, the following method is used:

Firstly, the sub-bands of the filter bank are re-divided into a plurality of SNR sub-bands, and division indexes are as follows in the following table

| SNR sub-band serial number | Start filter bank sub-band serial number (Sub_Start_index) | End filter bank sub-band serial number (Sub_end_index) |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 8 |
| 8 | 9 | 10 |
| 9 | 11 | 12 |
| 10 | 13 | 16 |

-continued

| SNR sub-band serial number | Start filter bank sub-band serial number (Sub_Start_index) | End filter bank sub-band serial number (Sub_end_index) |
|---|---|---|
| 11 | 17 | 24 |
| 12 | 25 | 36 |

Secondly, each SNR sub-band energy of the current frame is calculated according to the division manner of the SNR sub-bands. The calculation equation is as follows:

$$E_{sb2}[n] = \sum_{k=Sub\_Start\_index(n)}^{Sub\_end\_index(n)} E_{sb}[k]; 0 \le n < 13;$$

Then, a sub-band average SNR, SNR1, is calculated according to each SNR sub-band energy of the current frame and each SNR sub-band background noise energy of the previous frame. A calculation equation is as follows:

$$SNR1 = \frac{1}{num\_band} \sum_{n=0}^{num\_band-1} \log_2 \frac{E_{sb2}(n)}{E_{sb2\_bg}(n)}.$$

Herein, $E_{sb2\_bg}$ is the estimated SNR sub-band background noise energy of the previous frame, and num_band is the number of SNR sub-bands. The principle of obtaining the SNR sub-band background noise energy of the previous frame is the same as that of obtaining the SNR sub-band background noise energy of the current frame. The process of obtaining the SNR sub-band background noise energy of the current frame can be known with reference to step 107 in the embodiment one below.

Finally, the SNR of all sub-bands, SNR2, is calculated according to estimated energy of background noise over all sub-bands in the previous frame and the frame energy of the current frame:

$$SNR2 = \log_2 \frac{E_{t1}}{E_{t\_bg}}$$

Herein, $E_{t\_bg}$ is the estimated energy of background noise over all sub-bands of the previous frame, and the principle of obtaining the energy of background noise over all sub-bands of the previous frame is the same as that of obtaining the energy of background noise over all sub-bands of the current frame. The process of obtaining the energy of background noise over all sub-bands of the current frame can be known with reference to step 107 in the embodiment one below.

In this embodiment, the SNR parameters include the sub-band average SNR, SNR1, and the SNR of all sub-bands, SNR2. The energy of background noise over all sub-bands and each sub-band background noise energy are collectively referred to as background noise energy.

In step 104, a tonality signal flag of the current frame is calculated according to the frame energy parameter, the spectral centroid feature, the time-domain stability feature, the spectral flatness feature and the tonality feature of the current frame.

In 104a, it is assumed that the current frame signal is a non-tonal signal and a tonal frame flag tonality_frame is used to indicate whether the current frame is a tonal frame.

In this embodiment, a value of tonality_frame being 1 represents that the current frame is a tonal frame, and the value being 0 represents that the current frame is a non-tonal frame.

In 104b, it is judged whether the tonality feature or its smoothed value is greater than the corresponding set threshold tonality_decision_thr1 or tonality_decision_thr2, and if one of the above conditions is met, step 104c is executed; otherwise, step 104d is executed.

Herein, a value range of tonality_decision_thr1 is [0.5, 0.7], and a value range of tonality_decision_thr2 is [0.7, 0.99].

In 104c, if the time-domain stability feature lt_stable_rate0 is less than a set threshold lt_stable_decision_thr1, the spectral centroid feature sp_center[1] is greater than a set threshold spc_decision_thr1, and one of three spectral flatness features is smaller than its threshold, it is determined that the current frame is a tonal frame, and the value of the tonal frame flag tonality_frame is set to 1; otherwise it is determined that the current frame is a non-tonal frame, the value of the tonal frame flag tonality_frame is set to 0, and step 104d continues to be performed.

Herein, a value range of the threshold lt_stable_decision_thr1 is [0.01, 0.25], and a value range of spc_decision_thr1 is [1.0, 1.8].

In 104d, the tonal level feature tonality_degree is updated according to the tonal frame flag tonality_frame. The initial value of tonal level feature tonality_degree is set in the region [0, 1] when the active-sound detection begins. In different cases, calculation methods for the tonal level feature tonality_degree are different.

If the current tonal frame flag indicates that the current frame is a tonal frame, the following equation is used to update the tonal level feature tonality_degree:

tonality_degree=tonality_degree$_{-1}$●td_scale_A+td_scale_B;

Herein, tonality_degree$_{-1}$ is the tonal level feature of the previous frame, with a value range of the initial value thereof of [0,1], td_scale_A is an attenuation coefficient, with a value range of [0,1] and td_scale_B is a cumulative coefficient, with a value range of [0,1].

In 104e, whether the current frame is a tonal signal is determined according to the updated tonal level feature tonality_degree, and the value of the tonality signal flag tonality_flag is set.

If the tonal level feature tonality_degree is greater than a set threshold, it is determined that the current frame is a tonal signal; otherwise, it is determined that the current frame is a non-tonal signal.

Figure 2:
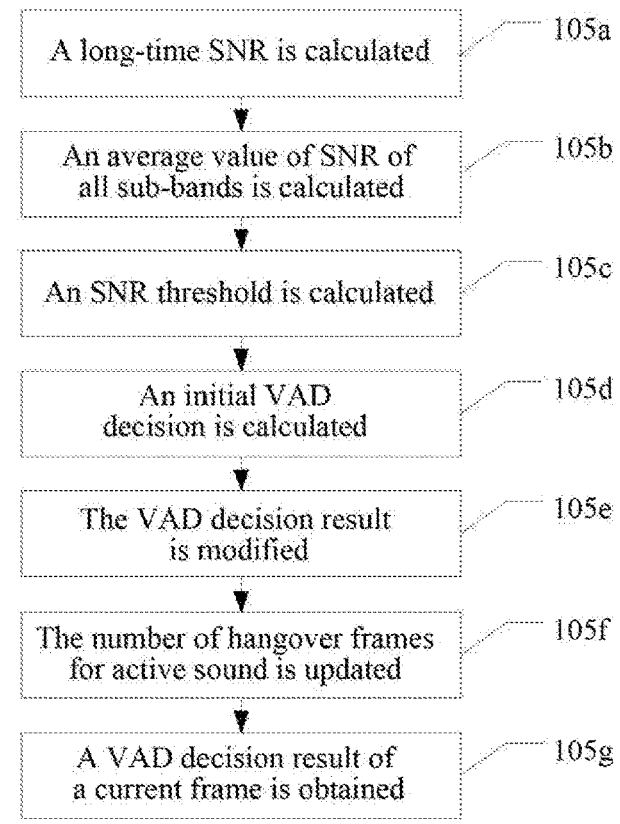
FIG. 2 is a diagram of a process of obtaining a VAD decision result according to the embodiment one of the present disclosure.

In step 105, a VAD decision result is calculated according to the tonality signal flag, the SNR parameter, the spectral centroid feature, and the frame energy parameter, and as shown in FIG. 2, the steps are as follows.

In step 105a, the long-time SNR lt_snr is obtained by computing the ratio of the average energy of long-time active frames to the average energy of long-time background noise for the previous frame.

The average energy of long-time active frames $E_{fg}$ and the average energy of long-time background noise $E_{bg}$ are calculated and defined in step 105g. A long-time SNR lt_snr is calculated as follows:

$$\mathrm{lt\_snr} = \log_{10} \frac{E_{fg}}{E_{bg}},$$

herein, in this equation, the long-time SNR lt_snr is expressed logarithmiCally.

In step 105b, an average value of SNR of all sub-bands SNR2 for multiple frames closest to the current frame is calculated to obtain an average total SNR of all sub-bands SNR2_lt_ave.

A calculation equation is as follows:

$$SNR2\_lt\_ave = \frac{1}{F\_num} \sum_{n=0}^{F\_num-1} SNR2(n)$$

SNR2(n) represents a value of SNR of all sub-bands SNR2 at the $n^{th}$ previous frame of the current frame, and F_num is the total number of frames for the calculation of the average value, with a value range of [8,64].

In step 105c, a SNR threshold for making VAD decision snr_thr is obtained according to the spectral centroid feature, the long-time SNR lt_snr, the number of continuous active frames continuous_speech_num, the number of continuous noise frames continuous_noise_num.

Implementation steps are as follows.

Firstly, an initial SNR threshold snr_thr, with a range of [0.1, 2], is set to for example 1.06.

Secondly, the SNR threshold snr_thr is adjusted for the first time according to the spectral centroid feature. The steps are as follows. If the value of the spectral centroid feature sp_center[2] is greater than a set threshold spc_vad_dec_thr1, then snr_thr is added with an offset value, and in this example, the offset value is taken as 0.05; otherwise, if sp_center[1] is greater than spc_vad_dec_thr2, then snr_thr is added with an offset value, and in this example, the offset value is taken as 0.10; otherwise, snr_thr is added with an offset value, and in this example, the offset value is taken as 0.40, herein value ranges of the thresholds spc_vad_dec_thr1 and spc_vad_dec_thr2 are [1.2, 2.5].

Then, snr_thr is adjusted for the second time according to the number of continuous active frames continuous_speech_num, the number of continuous noise frames continuous_noise_num, the average total SNR of all sub-bands SNR2_lt_ave and the long-time SNR lt_snr. If the number of continuous active frames continuous_speech_num is greater than a set threshold cpn_vad_dec_thr1, 0.2 is subtracted from snr_thr; otherwise, if the number of continuous noise frames continuous_noise_num is greater than a set threshold cpn_vad_dec_thr2, and SNR2_lt_ave is greater than an offset value plus the long-time SNR lt_snr multiplied with a coefficient lt_tsnr_scale, snr_thr is added with an offset value, and in this example, the offset value is taken as 0.1; otherwise, if continuous_noise_num is greater than a set threshold cpn_vad_dec_thr3, snr_thr is added with an offset value, and in this example, the offset value is taken as 0.2; otherwise if continuous_noise_num is greater than a set threshold cpn_vad_dec_thr4, snr_thr is added with an offset value, and in this example, the offset value is taken as 0.1. Herein, value ranges of the thresholds cpn_vad_dec_thr1, cpn_vad_dec_thr2, cpn_vad_dec_thr3 and cpn_vad_dec_thr4 are [2, 500], and a value range of the coefficient lt_tsnr_scale is [0, 2]. The embodiment of the present disclosure can also be implemented by skipping the present step to directly proceed to the final step.

Finally, a final adjustment is performed on the SNR threshold snr_thr according to the long-time SNR lt_snr to obtain the SNR threshold snr_thr of the current frame.

The adjustment equation is as follows:

$$snr\_thr = snr\_thr + (lt\_snr - thr\_offset) \cdot thr\_scale.$$

Herein, thr_offset is an offset value, with a value range of [0.5, 3]; and thr_scale is a gain coefficient, with a value range of [0.1, 1].

In step 105d, an initial VAD decision is calculated according to the SNR threshold snr_thr and the SNR parameters SNR1 and SNR2 calculated at the current frame.

A calculation process is as follows.

If SNR1 is greater than the SNR threshold snr_thr, it is determined that the current frame is an active frame, and a value of VAD flag vad_flag is used to indicate whether the current frame is an active frame. In the present embodiment, 1 is used to represent that the current frame is an active frame, and 0 is used to represent that the current frame is a non-active frame. Otherwise, it is determined that the current frame is a non-active frame and the value of the VAD flag vad_flag is set to 0.

If SNR2 is greater than a set threshold snr2_thr, it is determined that the current frame is an active frame and the value of the VAD flag vad_flag is set to 1. Herein, a value range of snr2_thr is [1.2, 5.0].

In step 105e, the initial VAD decision is modified according to the tonality signal flag, the average total SNR of all sub-bands SNR2_lt_ave, the spectral centroid feature, and the long-time SNR lt_snr.

Steps are as follows.

If the tonality signal flag indicates that the current frame is a tonal signal, that is, tonality_flag is 1, then it is determined that the current frame is an active signal and the flag vad_flag is set to 1.

If the average total SNR of all sub-bands SNR2_lt_ave is greater than a set threshold SNR2_lt_ave_t_thr1 plus the long-time SNR lt_snr multiplied with a coefficient lt_tsnr_tscale, then it is determined that the current frame is an active frame and the flag vad_flag is set to 1.

Herein, in the present embodiment, a value range of SNR2_lt_ave_thr1 is [1, 4], and a value range of lt_tsnr_tscale is [0.1, 0.6].

If the average total SNR of all sub-bands SNR2_lt_ave is greater than a set threshold SNR2_lt_ave_t_thr2, the spectral centroid feature sp_center[2] is greater than a set threshold sp_center_t_thr1 and the long-time SNR lt_snr is less than a set threshold lt_tsnr_t_thr1, it is determined that the current frame is an active frame, and the flag vad_flag is set to 1. Herein, a value range of SNR2_lt_ave_t_thr2 is [1.0, 2.5], a value range of sp_center_t_thr1 is [2.0, 4.0], and a value range of lt_tsnr_t_thr1 is [2.5, 5.0].

If SNR2_lt_ave is greater than a set threshold SNR2_lt_ave_t_thr3, the spectral centroid feature sp_center[2] is greater than a set threshold sp_center_t_thr2 and the long-time SNR lt_snr is less than a set threshold lt_tsnr_t_thr2, it is determined that the current frame is an active frame and the flag vad_flag is set to 1. Herein, a value range of SNR2_lt_ave_t_thr3 is [0.8, 2.0], a value range of sp_center_t_thr2 is [2.0, 4.0], and a value range of lt_tsnr_t_thr2 is [2.5, 5.0].

If SNR2_lt_ave is greater than a set threshold SNR2_lt_ave_t_thr4, the spectral centroid feature sp_center[2] is greater than a set threshold sp_center_t_thr3 and the long-time SNR lt_snr is less than a set threshold lt_tsnr_t_thr3, it is determined that the current frame is an active frame and the flag vad_flag is set to 1. Herein, a value range of SNR2_lt_ave_t_thr4 is [0.6, 2.0], a value range of SNR2_lt_ave_t_thr4 is [3.0, 6.0], and a value range of lt_tsnr_t_thr3 is [2.5, 5.0].

In step 105f, the number of hangover frames for active sound is updated according to the decision results of several previous frames, the long-time SNR lt_snr, and the average total SNR of all sub-bands SNR2_lt_ave and the VAD decision for the current frame.

Calculation steps are as follows.

The precondition for updating the current number of hangover frames for active sound is that the flag of active sound indicates that the current frame is active sound. If the condition is not satisfied, the current number of hangover frames num_speech_hangover is not updated and the process directly goes to step 105g.

Steps of updating the number of hangover frames are as follows.

If the number of continuous active frames continuous_speech_num is less than a set threshold continuous_speech_num_thr1 and lt_snr is less than a set threshold lt_tsnr_h_thr1, the current number of hangover frames for active sound num_speech_hangover is updated by subtracting the number of continuous active frames continuous_speech_num from the minimum number of continuous active frames. Otherwise, if SNR2_lt_ave is greater than a set threshold SNR2_lt_ave_thr1 and the number of continuous active frames continuous_speech_num is greater than a set second threshold continuous_speech_num_thr2, the number of hangover frames for active sound num_speech_hangover is set according to the value of lt_snr. Otherwise, the number of hangover frames num_speech_hangover is not updated. Herein, in the present embodiment, the minimum number of continuous active frames is 8, which may be between [6, 20]. The first threshold continuous_speech_num_thr1 and the second threshold continuous_speech_num_thr2 may be the same or different.

Steps are as follows.

If the long-time SNR lt_snr is greater than 2.6, the value of num_speech_hangover is 3; otherwise, if the long-time SNR lt_snr is greater than 1.6, the value of num_speech_hangover is 4; otherwise, the value of num_speech_hangover is 5.

In step 105g, a hangover of active sound is added according to the decision result and the number of hangover frames num_speech_hangover of the current frame, to obtain the VAD decision of the current frame.

The method thereof is as follows.

If the current frame is determined to be an inactive sound, that is the VAD flag is 0, and the number of hangover frames num_speech_hangover is greater than 0, the hangover of active sound is added, that is, the VAD flag is set to 1 and the value of num_speech_hangover is decreased by 1.

The final VAD decision of the current frame is obtained.

Alternatively, after step 105d, the following step may further be included: calculating the average energy of long-time active frames $E_{fg}$ according to the initial VAD decision result, herein the calculated value is used for VAD decision of the next frame; and after step 105g, the following step may further be included: calculating the average energy of long-time background noise $E_{bg}$ according to the VAD decision result of the current frame, herein the calculated value is used for VAD decision of the next frame.

A calculation process of the average energy of long-time active frames $E_{fg}$ is as follows;

a) if the initial VAD decision result indicates that the current frame is an active frame, that is, the value of the VAD flag is 1 and $E_{t1}$ is many times (which is 6 times in the present embodiment) greater than $E_{bg}$, the cumulative value of average energy of long-time active frames fg_energy and the cumulative number of average energy of long-time active frames fg_energy_count are updated. An updating method is to add $E_{t1}$ to fg_energy to obtain a new fg_energy, and add 1 to fg_energy_count to obtain a new fg_energy_count.

b) in order to ensure that the average energy of long-time active frames reflects the latest energy of active frames, if the cumulative number of average energy of long-time active frames is equal to a set value fg_max_frame_num, the cumulative number and the cumulative value are multiplied by an attenuation coefficient attenu_coef1 at the same time. In the present embodiment, a value of fg_max_frame_num is 512 and a value of attenu_coef1 is 0.75.

c) the cumulative value of average energy of long-time active frames fg_energy is divided by the cumulative number of average energy of long-time active frames to obtain the average energy of long-time active frames, and a calculation equation is as follows:

$$E_{fg} = \frac{fg\_energy}{fg\_energy\_count}.$$

A calculation method for the average energy of long-time background noise $E_{bg}$ is as follows.

It is assumed that bg_energy_count is the cumulative number of background noise frames, which is used to record how many frames of latest background noise are included in the energy cumulation. bg_energy is the cumulative energy of latest background noise frames.

a) if the current frame is determined to be a non-active frame, the value of the VAD flag is 0, and if SNR2 is less than 1.0, the cumulative energy of background noise bg_energy and the cumulative number of background noise frames bg_energy_count are updated. The updating method is to add the cumulative energy of background noise bg_energy to $E_{t1}$ to obtain a new cumulative energy of background noise bg_energy. The cumulative number of background noise frames bg_energy_count is added by 1 to obtain a new cumulative number of background noise frames bg_energy_count.

b) if the cumulative number of background noise frames bg_energy_count is equal to the maximum cumulative number of background noise frames, the cumulative number and the cumulative energy are multiplied by an attenuation coefficient attenu_coef2 at the same time. Herein, in this embodiment, the maximum cumulative number for calculating the average energy of long-time background noise is 512, and the attenuation coefficient attenu_coef2 is equal to 0.75.

c) the cumulative energy of background noise bg_energy is divided by the cumulative number of background noise frames to obtain the average energy of long-time background noise, and a calculation equation is as follows:

$$E_{bg} = \frac{bg\_energy}{bg\_energy\_count}.$$

In addition, it is to be illustrated that the embodiment one may further include the following steps.

In step 106, a background noise update flag is calculated according to the VAD decision result, the tonality feature, the SNR parameter, the tonality signal flag, and the time-domain stability feature of the current frame. A calculation method can be known with reference to the embodiment two described below.

In step 107, the background noise energy of the current frame is obtained according to the background noise update flag, the frame energy parameter of the current frame, and the energy of background noise over all sub-bands of the previous frame, and the background noise energy of the current frame is used to calculate the SNR parameter for the next frame.

Herein, whether to update the background noise is judged according to the background noise update flag, and if the background noise update flag is 1, the background noise is updated according to the estimated value of the energy of background noise over all sub-bands and the energy of the current frame. Estimation of the background noise energy includes both estimations of the sub-band background noise energy and estimation of energy of background noise over all sub-bands.

a. an estimation equation for the sub-band background noise energy is as follows:

$$E_{sb2\_bg}(k) = E_{sb2\_bg\_pre}(k) \bullet \alpha_{bg\_e} + E_{sb2\_bg}(k) \bullet (1-\alpha_{bg\_e}); \ 0 \leq k < num\_sb.$$

Herein, num_sb is the number of SNR sub-bands, and $E_{sb2\_bg\_pre}(k)$ represents the background noise energy of the $k^{th}$ SNR sub-band of the previous frame.

$\alpha_{bg\_e}$ is a background noise update factor, and the value is determined by the energy of background noise over all sub-bands of the previous frame and the energy parameter of the current frame. A calculation process is as follows.

If the energy of background noise over all sub-bands $E_{t\_bg}$ of the previous frame is less than the frame energy $E_{t1}$ of the current frame, a value thereof is 0.96, otherwise the value is 0.95.

b. estimation of the energy of background noise over all sub-bands:

If the background noise update flag of the current frame is 1, the cumulative value of background noise energy $E_{t\_sum}$ and the cumulative number of background noise energy frames $N_{Et\_counter}$ are updated, and a calculation equation is as follows:

$$E_{t\_sum} = E_{t\_sum\_-1} + E_{t1};$$

$$N_{Et\_counter} = N_{Et\_counter\_-1} + 1;$$

Herein, $E_{t\_sum\_-1}$ is the cumulative value of background noise energy of the previous frame, and $N_{Et\_counter\_-1}$ is the cumulative number of background noise energy frames calculated at the previous frame.

c. the energy of background noise over all sub-bands is obtained by a ratio of the cumulative value of background noise energy $E_{t\_sum}$ and the cumulative number of frames $N_{Et\_counter}$:

$$E_{t\_bg} = \frac{E_{t\_sum}}{N_{Et\_counter}}.$$

It is judged whether $N_{Et\_counter}$ is equal to 64, if $N_{Et\_counter}$ is equal to 64, the cumulative value of background noise energy $E_{t\_sum}$ and the cumulative number of frames $N_{Et\_counter}$ are multiplied by 0.75 respectively.

d. the sub-band background noise energy and the cumulative value of background noise energy are adjusted according to the tonality signal flag, the frame energy parameter and the energy of background noise over all sub-bands. A calculation process is as follows.

If the tonality signal flag tonality_flag is equal to 1 and the value of the frame energy parameter $E_{t1}$ is less than the value of the background noise energy $E_{t\_bg}$ multiplied by a gain coefficient gain, $$E_{t\_sum} = E_{t\_sum} \cdot gain + delta; \ E_{sb2\_bg}(k) = E_{sb2\_bg}(k) \cdot gain + delta;$$

Herein, a value range of gain is [0.3, 1].

Embodiment Two

Figure 3:
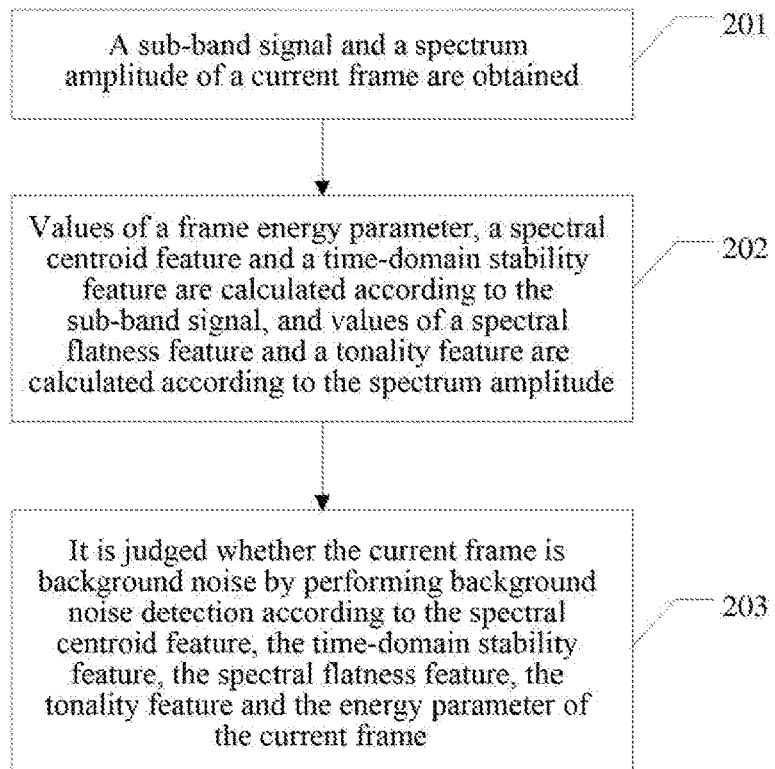
FIG. 3 is a flowchart of a method for detecting a background noise according to embodiment two of the present disclosure.

The embodiment of the present disclosure further provides an embodiment of a method for detecting background noise, as shown in FIG. 3, including the following steps.

In step 201, a sub-band signal and a spectrum amplitude of a current frame are obtained.

In step 202, values of a frame energy parameter, a spectral centroid feature and a time-domain stability feature are calculated according to the sub-band signal, and values of a spectral flatness feature and a tonality feature are calculated according to the spectrum amplitude.

The frame energy parameter is a weighted cumulative value or a direct cumulative value of energy of all sub-band signals.

The spectral centroid feature is the ratio of the weighted sum to the non-weighted sum of energies of all sub-bands or partial sub-bands, or the value is obtained by performing smooth filtering on this ratio.

The time-domain stability feature is the ratio of the variance of the sum of energy amplitudes to the expectation of the squared sum of energy amplitudes, or the ratio multiplied by a factor.

The spectral flatness feature is the ratio of the geometric mean to the arithmetic mean of predetermined smoothed spectrum amplitudes, or the ratio multiplied by a factor.

The same methods as above may be used in steps 201 and 202, and will not be described again.

In step 203, it is judged whether the current frame is background noise by performing background noise detection according to the spectral centroid feature, the time-domain stability feature, the spectral flatness feature, the tonality feature and the energy parameter of the current frame.

Firstly, it is assumed that the current frame is background noise and the background noise update flag is set to a first preset value; then, if any of the following conditions is met, it is determined that the current frame is not a background noise signal and the background noise update flag is set to a second preset value:

The time-domain stability feature lt_stable_rate0 is greater than a set threshold.

The smoothed value of the spectral centroid feature is greater than a set threshold, and the time-domain stability feature is also greater than a set threshold.

A value of the tonality feature or a smoothed value of the tonality feature is greater than a set threshold, and a value of the time-domain stability feature lt_stable_rate0 is greater than a set threshold.

A value of spectral flatness feature of each sub-band or smoothed value of spectral flatness feature of each sub-band is less than a respective corresponding set threshold, Or, a value of the frame energy parameter $E_{t1}$ is greater than a set threshold E_thr1.

Specifically, it is assumed that the current frame is a background noise.

In this embodiment, the background noise update flag background_flag is used to indicate whether the current frame is a background noise, and it is agreed that if the current frame is a background noise, the background noise update flag background_flag is set to 1 (the first preset value), otherwise, the background noise update flag background_flag is set to 0 (the second preset value).

It is detected whether the current frame is a noise signal according to the time-domain stability feature, the spectral centroid feature, the spectral flatness feature, the tonality feature, and the energy parameter of the current frame. If it is not a noise signal, the background noise update flag background_flag is set to 0.

The process is as follows.

It is judged whether the time-domain stability feature lt_stable_rate0 is greater than a set threshold lt_stable_rate_thr1. If so, it is determined that the current frame is not a noise signal and background_flag is set to 0. In this embodiment, a value range of the threshold lt_stable_rate_thr1 is [0.8, 1.6];

It is judged whether the smoothed value of spectral centroid feature is greater than a set threshold sp_center_thr1 and the value of time-domain stability feature is greater than a set threshold lt_stable_rate_thr2. If so, it is determined that the current frame is not a noise signal and background_flag is set to 0. A value range of sp_center_thr1 is [1.6, 4]; and a value range of lt_stable_rate_thr2 is (0, 0.1].

It is judged whether the value of tonality feature $F_T^{[0]}(1)$ is greater than a set threshold tonality_rate_thr1 and the value of time-domain stability feature lt_stable_rate0 is greater than a set threshold lt_stable_rate_thr3. If the above conditions are true at the same time, it is determined that the current frame is not a background noise, and the background_flag is assigned a value of 0. A value range of the threshold tonality_rate_thr1 is [0.4, 0.66], and a value range of the threshold lt_stable_rate_thr3 is [0.06, 0.3].

It is judged whether the value of spectral flatness feature $F_{SSF}(0)$ is less than a set threshold sSMR_thr1, it is judged whether a value of the spectral flatness feature $F_{SSF}(1)$ is less than a set threshold sSMR_thr2 and it is judged whether a value of the spectral flatness feature $F_{SSF}(2)$ is less than a set value sSMR_thr3. If the above conditions are true at the same time, it is determined that the current frame is not a background noise, and the background_flag is assigned a value of 0, herein value ranges of the thresholds sSMR_thr1, sSMR_thr2 and sSMR_thr3 are [0.88, 0.98]. It is judged whether the value of the spectral flatness feature $F_{SSF}(0)$ is less than a set threshold sSMR_thr4, it is judged whether the value of the spectral flatness feature $F_{SSF}(1)$ is less than a set threshold sSMR_thr5 and it is judged whether the value of the spectral flatness feature $F_{SSF}(2)$ is less than a set threshold sSMR_thr6. If any of the above conditions is true, it is determined that the current frame is not a background noise. The background_flag is assigned a value of 0. Value ranges of sSMR_thr4, sSMR_thr5 and sSMR_thr6 are [0.80, 0.92].

It is judged whether the value of frame energy parameter $E_{t1}$ is greater than a set threshold E_thr1. If the above condition is true, it is determined that the current frame is not a background noise. The background_flag is assigned a value of 0. E_thr1 is assigned a value according to a dynamic range of the frame energy parameter.

If the current frame is not detected as non-background noise, it indicates that the current frame is a background noise.

Embodiment Three

Figure 4:
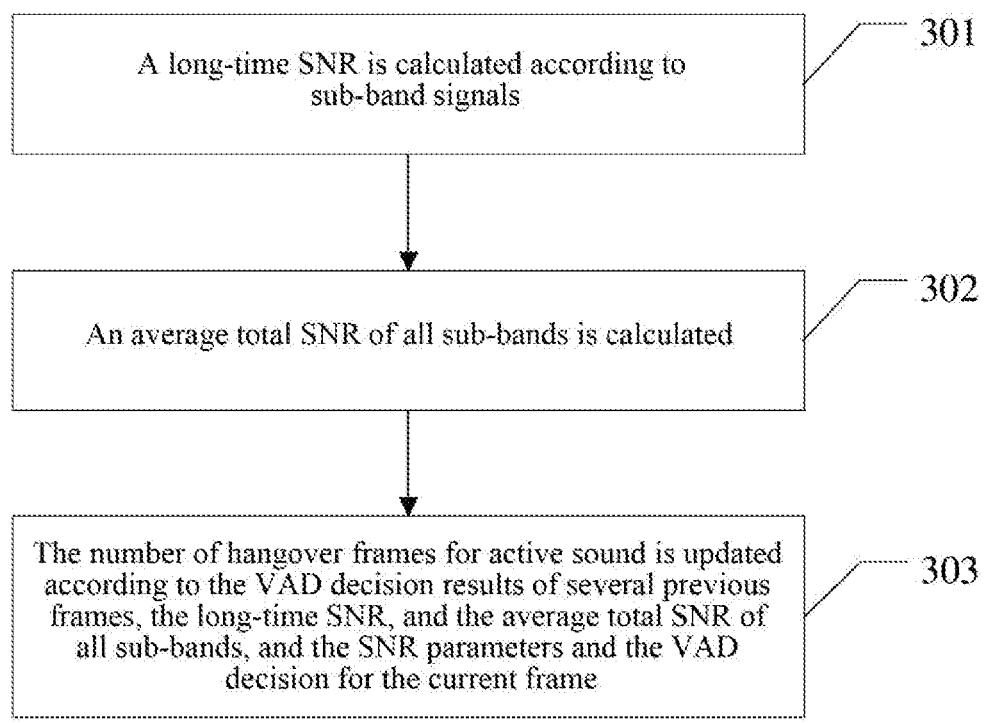
FIG. 4 is a flowchart of a method for correcting the current number of hangover frames for active sound in VAD decision according to embodiment three of the present disclosure.

The embodiment of the present disclosure further provides a method for updating the number of hangover frames for active sound in VAD decision, as shown in FIG. 4, including the following steps.

In step 301, the long-time SNR lt_snr is calculated according to sub-band signals.

The long-time SNR lt_snr is obtained by computing the ratio of the average energy of long-time active frames to the average energy of long-time background noise for the previous frame. The long-time SNR lt_snr may be expressed logarithmically.

In step 302, the average total SNR of all sub-bands SNR2_lt_ave is calculated.

The average total SNR of all sub-bands SNR2_lt_ave is obtained by calculating the average value of SNRs of all sub-bands $SNR2_S$ for multiple frames closest to the current frame.

In step 303, the number of hangover frames for active sound is updated according to the VAD decision results of several previous frames, the long-time SNR lt_snr, and the average total SNR of all sub-bands SNR2_lt_ave, and the SNR parameters and the VAD decision for the current frame.

It can be understood that the precondition for updating the current number of hangover frames for active sound is that the flag of active sound indicates that the current frame is active sound.

For updating the number of hangover frames for active sound, if the number of continuous active frames is less than a set threshold 1 and the long-time SNR lt_snr is less than a set threshold 2, the current number of hangover frames for active sound is updated by subtracting the number of continuous active frames from the minimum number of continuous active frames; otherwise, if the average total SNR of all sub-bands SNR2_lt_ave is greater than a set threshold 3 and the number of continuous active frames is greater than a set threshold 4, the number of hangover frames for active sound is set according to the value of long-time SNR lt_snr. Otherwise, the number of hangover frames num_speech_hangover is not updated.

Embodiment Four

Figure 5:
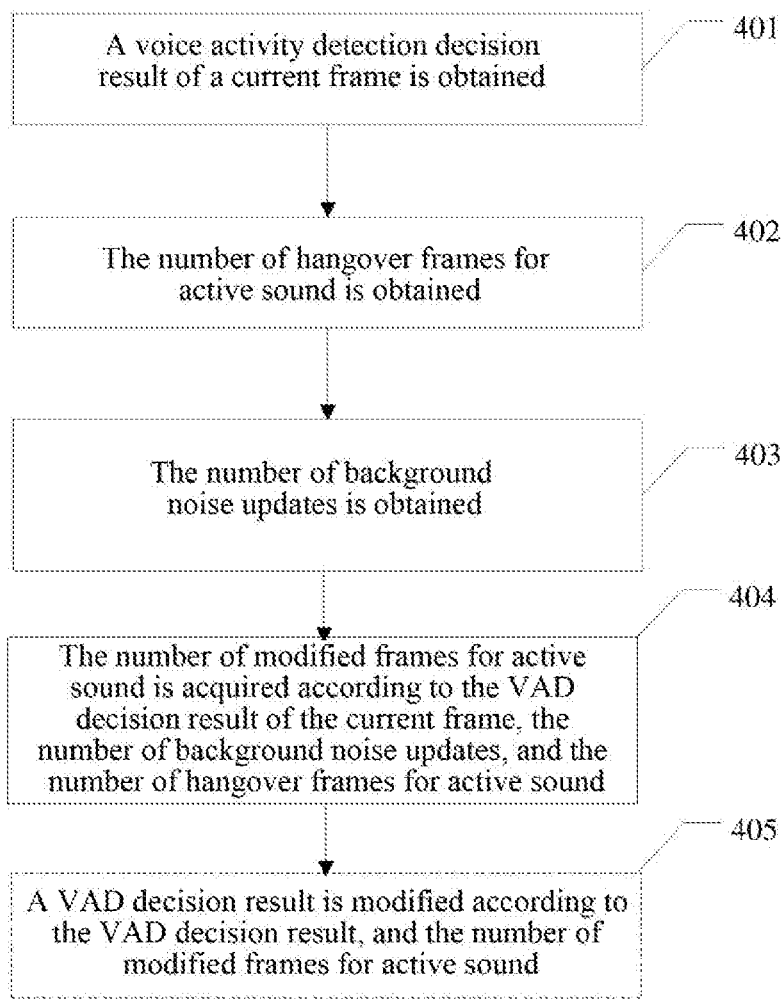
FIG. 5 is a flowchart of a method for acquiring the number of modified frames for active sound according to embodiment four of the present disclosure.

The embodiment of the present disclosure provides a method for acquiring the number of modified frames for active sound, as shown in FIG. 5, including the following steps.

In 401, a voice activity detection decision result of a current frame is obtained by the method described in the embodiment one of the present disclosure.

In 402, the number of hangover frames for active sound is obtained by the method described in embodiment three of the present disclosure.

In 403, the number of background noise updates update_count is obtained. Steps are as follows.

In 403a, a background noise update flag background_flag is calculated with the method described in embodiment two of the present disclosure;

In 403b, if the background noise update flag indicates that it is a background noise and the number of background noise updates is less than 1000, the number of background noise updates is increased by 1. Herein, an initial value of the number of background noise updates is set to 0.

In 404, the number of modified frames for active sound warm_hang_num is acquired according to the VAD decision result of the current frame, the number of background noise updates, and the number of hangover frames for active sound.

Herein, when the VAD decision result of the current frame is an active frame and the number of background noise updates is less than a preset threshold, for example, 12, the number of modified frames for active sound is selected as the maximum number of a constant, for example, 20 and the number of hangover frames for active sound.

In addition, 405 may further be included: modifying the VAD decision result according to the VAD decision result, and the number of modified frames for active sound, herein:

When the VAD decision result indicates that the current frame is inactive and the number of modified frames for active sound is greater than 0, the current frame is modified as active frame and meanwhile the number of modified frames for active sound is decreased by 1.

Figure 6:
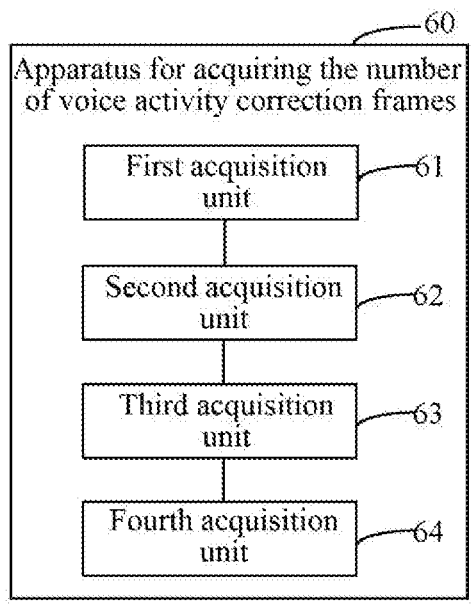
FIG. 6 is a structural diagram of an apparatus for acquiring the number of modified frames for active sound according to the embodiment four of the present disclosure.

Corresponding to the above method for acquiring the number of modified frames for active sound, the embodiment of the present disclosure further provides an apparatus 60 for acquiring the number of modified frames for active sound, as shown in FIG. 6, including the following units.

A first acquisition unit 61 is arranged to obtain the VAD decision of current frame.

A second acquisition unit 62 is arranged to obtain the number of hangover frames for active sound.

A third acquisition unit 63 is arranged to obtain the number of background noise updates.

A fourth acquisition unit 64 is arranged to acquire the number of modified frames for active sound according to the VAD decision result of the current frame, the number of background noise updates and the number of hangover frames for active sound.

The operating flow and the operating principle of each unit of the apparatus for acquiring the number of modified frames for active sound in the present embodiment can be known with reference to the description of the above method embodiments, and will not be repeated here.

Embodiment Five

Figure 7:
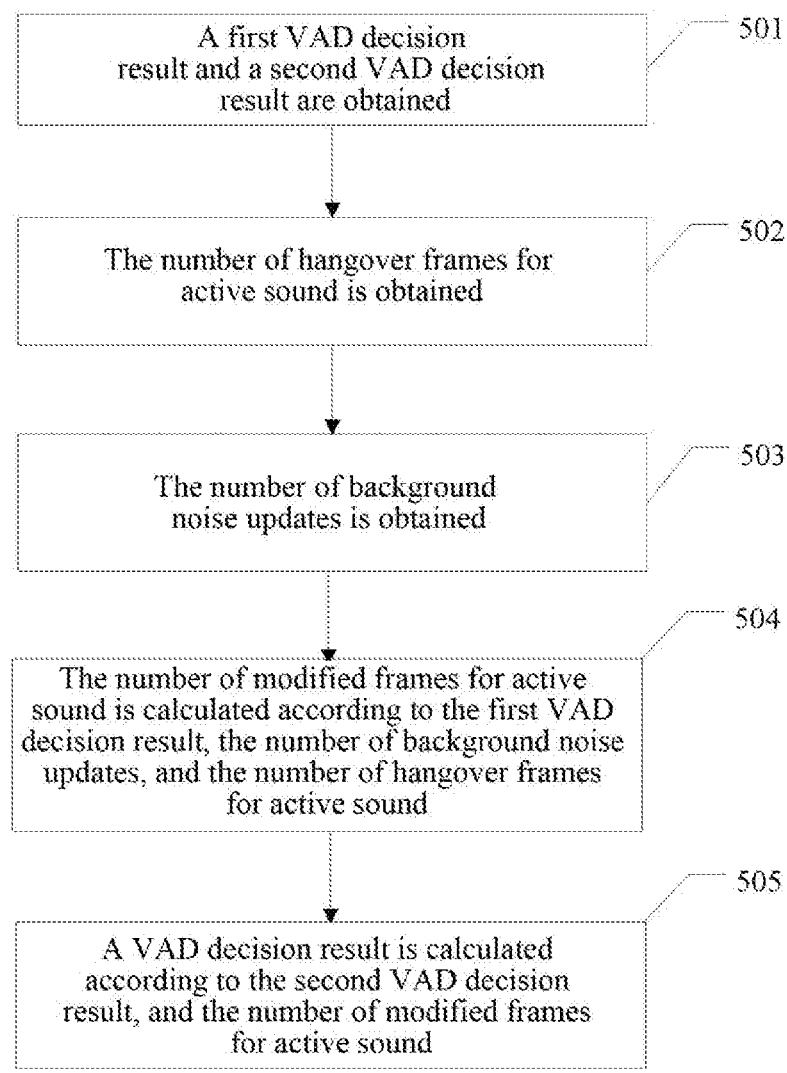
FIG. 7 is a flowchart of a method for voice activity detection according to embodiment five of the present disclosure.

The embodiment of the present disclosure provides a method for voice activity detection, as shown in FIG. 7, including the following steps.

In 501, a first VAD decision result vada_flag is obtained by the method described in the embodiment one of the present disclosure; and a second VAD decision result vadb_flag is obtained.

It should be noted that the second VAD decision result vadb_flag is obtained with any of the existing VAD methods, which will not be described in detail herein.

In 502, the number of hangover frames for active sound is obtained by the method described in the embodiment three of the present disclosure.

In 503, the number of background noise updates update_count is obtained. Steps are as follows.

In 503a, a background noise update flag background_flag is calculated with the method described in the embodiment two of the present disclosure.

In 503b, if the background noise update flag indicates that it is a background noise and the number of background noise updates is less than 1000, the number of background noise updates is increased by 1. Herein, an initial value of the number of background noise updates is set to 0.

In 504, the number of modified frames for active sound warm_hang_num is calculated according to the vada_flag, the number of background noise updates, and the number of hangover frames for active sound.

Herein, when the vada_flag indicates an active frame and the number of background noise updates is less than 12, the number of modified frames for active sound is selected to be a maximum value of 20 and the number of hangover frames for active sound.

In 505, a VAD decision result is calculated according to the vadb_flag, and the number of modified frames for active sound, herein, when the vadb_flag indicates that the current frame is an inactive frame and the number of modified frames for active sound is greater than 0, the current frame is modified as an active frame and the number of modified frames for active sound is decreased by 1 at the same time.

Figure 8:
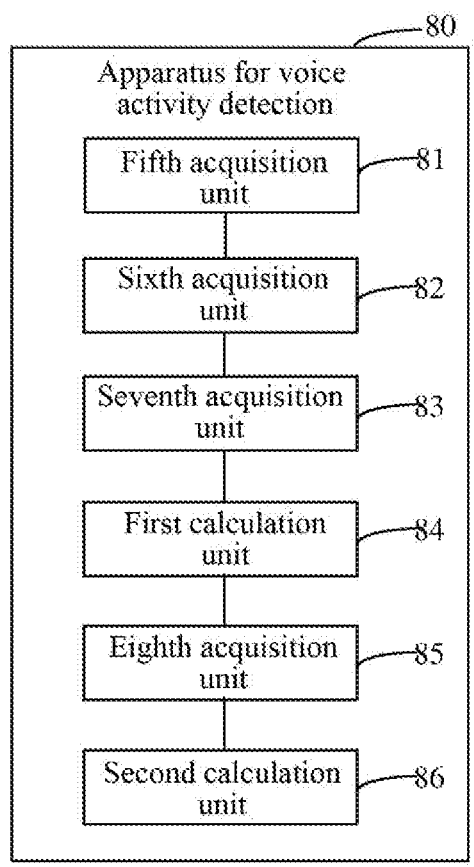
FIG. 8 is a structural diagram of an apparatus for voice activity detection according to the embodiment five of the present disclosure.

Corresponding to the above VAD method, the embodiment of the present disclosure further provides a VAD apparatus 80, as shown in FIG. 8, including the following units.

A fifth acquisition unit 81 is arranged to obtain a first voice activity detection decision result.

A sixth acquisition unit 82 is arranged to obtain the number of hangover frames for active sound.

A seventh acquisition unit 83 is arranged to obtain the number of background noise updates.

A first calculation unit 84 is arranged to calculate the number of modified frames for active sound according to the first voice activity detection decision result, the number of background noise updates, and the number of hangover frames for active sound.

An eighth acquisition unit 85 is arranged to obtain a second voice activity detection decision result.

A second calculation unit 86 is arranged to calculate the VAD decision result according to the number of modified frames for active sound and the second VAD decision result.

The operating flow and the operating principle of each unit of the VAD apparatus in the present embodiment can be known with reference to the description of the above method embodiments, and will not be repeated here.

Many modern voice coding standards, such as AMR, AMR-WB, support the VAD function. In terms of efficiency, the VAD of these encoders cannot achieve good performance under all typical background noises. Especially under an unstable noise, such as an office noise, the VAD of these encoders has low efficiency. For music signals, the VAD sometimes has error detection, resulting in significant quality degradation for the corresponding processing algorithm.

The solutions according to the embodiments of the present disclosure overcome the disadvantages of the existing VAD algorithms, and improve the detection efficiency of the VAD for the unstable noise while improving the detection accuracy of music. Thereby, better performance can be achieved for the voice and audio signal processing algorithms using the technical solutions according to the embodiments of the present disclosure.

In addition, the method for detecting a background noise according to the embodiment of the present disclosure can enable the estimation of the background noise to be more accurate and stable, which facilitates to improve the detection accuracy of the VAD. The method for detecting a tonal signal according to the embodiment of the present disclosure improves the detection accuracy of the tonal music. Meanwhile, the method for modifying the number of hangover frames for active sound according to the embodiment of the present disclosure can enable the VAD algorithm to achieve better balance in terms of performance and efficiency under different noises and signal-to-noise ratios. At the same time, the method for adjusting a decision signal-to-noise ratio threshold in VAD decision according to the embodiment of the present disclosure can enable the VAD decision algorithm to achieve better accuracy under different signal-to-noise ratios, and further improve the efficiency in a case of ensuring the quality.

A person having ordinary skill in the art can understand that all or a part of steps in the above embodiments can be implemented by a computer program flow, which can be stored in a computer readable storage medium and is performed on a corresponding hardware platform (for example, a system, a device, an apparatus, and a component etc.), and when performed, includes one of steps of the method embodiment or a combination thereof.

Alternatively, all or a part of steps in the above embodiments can also be implemented by integrated circuits, can be respectively made into a plurality of integrated circuit modules; alternatively, it is implemented with making several modules or steps of them into a single integrated circuit module.

Each apparatus/functional module/functional unit in the aforementioned embodiments can be implemented with general computing apparatuses, and can be integrated in a single computing apparatus, or distributed onto a network consisting of a plurality of computing apparatuses.

When each apparatus/functional module/functional unit in the aforementioned embodiments is implemented in a form of software functional modules and is sold or used as an independent product, it can be stored in a computer readable storage medium, which may be a read-only memory, a disk or a disc etc.

INDUSTRIAL APPLICABILITY

The technical solutions according to the embodiments of the present disclosure overcome the disadvantages of the existing VAD algorithms, and improve the detection efficiency of the VAD for the unstable noise while improving the detection accuracy of music. Thereby, the voice and audio signal processing algorithms using the technical solutions according to the embodiments of the present disclosure can achieve better performance. In addition, the method for detecting a background noise according to the embodiment of the present disclosure can enable the estimation of the background noise to be more accurate and stable, which facilitates to improve the detection accuracy of the VAD. Meanwhile the method for detecting a tonal signal according to the embodiment of the present disclosure improves the detection accuracy of the tonal music. At the same time, the method for modifying the number of hangover frames for active sound according to the embodiment of the present disclosure can enable the VAD algorithm to achieve better balance in terms of performance and efficiency under different noises and signal-to-noise ratios. The method for adjusting a decision signal-to-noise ratio threshold in VAD decision according to the embodiment of the present disclosure can enable the VAD decision algorithm to achieve better accuracy under different signal-to-noise ratios, and further improve the efficiency in a case of ensuring the quality.

What is claimed is:

1. A method for acquiring a number of modified frames for active sound, comprising:
    acquiring a voice activity detection, VAD, decision result of a current frame;
    acquiring a number of hangover frames for active sound;
    acquiring a number of background noise updates; and
    acquiring the number of modified frames for active sound according to the voice activity detection decision result of the current frame, the number of background noise updates and the number of hangover frames for active sound.

2. The method according to claim 1, wherein acquiring a voice activity detection decision result of a current frame comprises:
    acquiring a sub-band signal and a spectrum amplitude of the current frame;
    calculating a frame energy parameter, a spectral centroid feature and a time-domain stability feature of the current frame according to the sub-band signals; and calculating a spectral flatness feature and a tonality feature according to the spectrum amplitudes;
    calculating a signal-to-noise ratio, SNR, parameter of the current frame according to background noise energy estimated from a previous frame, the frame energy parameter and energy of SNR sub-bands of the current frame;
    calculating a tonality signal flag of the current frame according to the frame energy parameter, the spectral centroid feature, the time-domain stability feature, the spectral flatness feature, and the tonality feature; and
    calculating the VAD decision result according to the tonality signal flag, the SNR parameter, the spectral centroid feature, and the frame energy parameter.

3. The method according to claim 2, wherein calculating the voice activity detection decision result according to the tonality signal flag, the SNR parameter, the spectral centroid feature, and the frame energy parameter comprises:
    acquiring a long-time SNR by computing a ratio of average energy of long-time active frames to average energy of long-time background noise for the previous frame;
    acquiring an average total SNR of all sub-bands by calculating an average value of SNR of all sub-bands for a plurality of frames closest to the current frame;
    acquiring an SNR threshold for making VAD decision according to the spectral centroid feature, the long-time SNR, the number of continuous active frames and the number of continuous noise frames;
    acquiring an initial VAD decision according to the SNR threshold for VAD and the SNR parameter; and
    acquiring the VAD decision result by updating the initial VAD decision according to the tonality signal flag, the average total SNR of all sub-bands, the spectral centroid feature, and the long-time SNR.

4. The method according to claim 1, wherein acquiring the number of modified frames for active sound according to the voice activity detection decision result of the current frame, the number of background noise updates and the number of hangover frames for active sound comprises:
    when the VAD decision result indicates the current frame is an active frame and the number of background noise updates is less than a preset threshold, the number of modified frames for active sound is selected as a maximum value of a constant and the number of hangover frames for active sound.

5. The method according to claim 1, wherein acquiring the number of hangover frames for active sound comprises:
    acquiring a sub-band signal and a spectrum amplitude of the current frame; and
    calculating a long-time SNR and an average total SNR of all sub-bands according to the sub-band signal, and obtaining the number of hangover frames for active sound by updating the current number of hangover frames for active sound according to the VAD decision results of a plurality of previous frames, the long-time SNR, the average total SNR of all sub-bands, and the VAD decision result of the current frame.

6. The method according to claim 5, wherein updating the current number of hangover frames for active sound to acquire the number of hangover frames for active sound comprises:

if a number of continuous active frames is less than a set first threshold and the long-time SNR is less than a set threshold, the number of hangover frames for active sound is updated by subtracting the number of continuous active frames from the minimum number of continuous active frames; and if the average total SNR of all sub-bands is greater than a set threshold and the number of continuous active frames is greater than a set second threshold, setting a value of the number of hangover frames for active sound according to the value of the long-time SNR.

7. The method according to claim 1, wherein acquiring a number of background noise updates comprises:

acquiring a background noise update flag; and
calculating the number of background noise updates according to the background noise update flag.

8. The method according to claim 7, wherein acquiring a background noise update flag comprises:

acquiring a sub-band signal and a spectrum amplitude of the current frame;
calculating a frame energy parameter, a spectral centroid feature and a time-domain stability feature according to the sub-band signal; and calculating a spectral flatness feature and a tonality feature according to the spectrum amplitude; and
performing background noise detection according to the spectral centroid feature, the time-domain stability feature, the spectral flatness feature, the tonality feature, and the frame energy parameter to acquire the background noise update flag.

9. A method for voice activity detection, comprising:
acquiring a first voice activity detection decision result;
acquiring a number of hangover frames for active sound;
acquiring a number of background noise updates;
calculating a number of modified frames for active sound according to the first voice activity detection decision result, the number of background noise updates, and the number of hangover frames for active sound;
acquiring a second voice activity detection decision result; and
calculating the voice activity detection decision result according to the number of modified frames for active sound and the second voice activity detection decision result.

10. The method according to claim 9, wherein calculating the voice activity detection decision result according to the number of modified frames for active sound and the second voice activity detection decision result comprises:

when the second voice activity detection decision result indicates that the current frame is an inactive frame and the number of modified frames for active sound is greater than 0, setting the voice activity detection decision result as an active frame, and reducing the number of modified frames for active sound by 1.

11. The method according to claim 9, wherein acquiring a first voice activity detection decision result comprises:

acquiring a sub-band signal and a spectrum amplitude of a current frame;
calculating a frame energy parameter, a spectral centroid feature and a time-domain stability feature of the current frame according to the sub-band signal; and
calculating a spectral flatness feature and a tonality feature according to the spectrum amplitude;
calculating a signal-to-noise ratio parameter of the current frame according to background noise energy acquired from a previous frame, the frame energy parameter and signal-to-noise ratio sub-band energy;
calculating a tonality signal flag of the current frame according to the frame energy parameter, the spectral centroid feature, the time-domain stability feature, the spectral flatness feature, and the tonality feature; and
calculating the first voice activity detection decision result according to the tonality signal flag, the signal-to-noise ratio parameter, the spectral centroid feature, and the frame energy parameter.

12. The method according to claim 11, wherein calculating the first voice activity detection decision result according to the tonality signal flag, the signal-to-noise ratio parameter, the spectral centroid feature, and the frame energy parameter comprises:

calculating a long-time SNR through a ratio of average energy of long-time active frames and average energy of long-time background noise calculated at the previous frame;
calculating an average value of SNRs of all sub-bands of a plurality of frames closest to the current frame to acquire an average total SNR of all sub-bands;
acquiring a voice activity detection decision threshold according to the spectral centroid feature, the long-time SNR, the number of continuous active frames and the number of continuous noise frames;
calculating an initial voice activity detection decision result according to the voice activity detection decision threshold and the signal-to-noise ratio parameter; and
modifying the initial voice activity detection decision result according to the tonality signal flag, the average total SNR of all sub-bands, the spectral centroid feature, and the long-time SNR to acquire the first voice activity detection decision result.

13. The method according to claim 9, wherein acquiring the number of hangover frames for active sound comprises:

acquiring a sub-band signal and a spectrum amplitude of a current frame; and
calculating a long-time SNR and an average total SNR of all sub-bands according to the sub-band signals, and modifying the current number of hangover frames for active sound according to voice activity detection decision results of a plurality of previous frames, the long-time SNR, the average total SNR of all sub-bands, and the first voice activity detection decision result.

14. The method according to claim 13, wherein modifying the current number of hangover frames for active sound comprises:

if the number of continuous voice frames is less than a set first threshold and the long-time SNR is less than a set threshold, the number of hangover frames for active sound being equal to a minimum number of continuous active frames minus the number of continuous active frames; and if the average total SNR of all sub-bands is greater than a set second threshold and the number of continuous active frames is greater than a set threshold, setting a value of the number of hangover frames for active sound according to a size of the long-time SNR.

15. The method according to claim 9, wherein acquiring a number of background noise updates comprises:

acquiring a background noise update flag; and
calculating the number of background noise updates according to the background noise update flag.

16. The method according to claim 15, wherein calculating the number of background noise updates according to the background noise update flag comprises:
when the background noise update flag indicates that a current frame is a background noise and the number of background noise updates is less than a set threshold, adding the number of background noise updates by 1.

17. The method according to claim 15, wherein acquiring a background noise update flag comprises:
acquiring a sub-band signal and a spectrum amplitude of a current frame;
calculating values of a frame energy parameter, a spectral centroid feature and a time-domain stability feature according to the sub-band signal; and calculating values of a spectral flatness feature and a tonality feature according to the spectrum amplitude; and
performing background noise detection according to the spectral centroid feature, the time-domain stability feature, the spectral flatness feature, the tonality feature, and the frame energy parameter to acquire the background noise update flag.

18. The method according to claim 9, wherein calculating the number of modified frames for active sound according to the first voice activity detection decision result, the number of background noise updates and the number of hangover frames for active sound comprises:
when the first voice activity detection decision result is an active frame and the number of background noise updates is less than a preset threshold, the number of modified frames for active sound being a maximum value of a constant and the number of hangover frames for active sound.

19. An apparatus for acquiring a number of modified frames for active sound, comprising:
a processor; and
a memory for storing instructions executable by the processor,
wherein the processor is configured to:
acquire a voice activity detection decision result of a current frame;
acquire a number of hangover frames for active sound;
acquire a number of background noise updates; and
acquire the number of modified frames for active sound according to the voice activity detection decision result of the current frame, the number of background noise updates and the number of hangover frames for active sound.

20. An apparatus for voice activity detection, comprising:
a processor; and
a memory for storing instructions executable by the processor, wherein the processor is configured to:
acquire a first voice activity detection decision result;
acquire a number of hangover frames for active sound;
acquire a number of background noise updates;
calculate a number of modified frames for active sound according to the first voice activity detection decision result, the number of background noise updates, and the number of hangover frames for active sound;
acquire a second voice activity detection decision result; and
calculate the voice activity detection decision result according to the number of modified frames for active sound and the second voice activity detection decision result.

* * * * *

UNITED STATES PATENT AND TRADEMARK OFFICE
CERTIFICATE OF CORRECTION

| | | |
|---|---|---|
| PATENT NO. | : 10,522,170 B2 | |
| APPLICATION NO. | : 15/577343 | |
| DATED | : December 31, 2019 | |
| INVENTOR(S) | : Zhu et al. | |

It is certified that error appears in the above-identified patent and that said Letters Patent is hereby corrected as shown below:

In the Claims

Replace Column 27, Line 60-Column 32, Line 32, (approx.) with attached Claims:

1. A method for acquiring a number of modified frames for active sound, comprising:
acquiring a voice activity detection (VAD) decision result of a current frame;
acquiring a number of hangover frames for active sound;
acquiring a number of background noise updates; and
acquiring the number of modified frames for active sound according to the
VAD decision result of the current frame, the number of background noise updates
and the number of hangover frames for active sound.

2. The method according to claim 1, wherein acquiring the VAD decision result of the current frame comprises:
acquiring a sub-band signal and a spectrum amplitude of the current frame;
calculating a frame energy parameter, a spectral centroid feature and a time-domain stability
feature of the current frame according to the sub-band signals; and calculating a spectral
flatness feature and a tonality feature according to the spectrum amplitude;
calculating a signal-to-noise ratio (SNR) parameter of the current frame according to
background noise energy estimated from a previous frame, the frame energy parameter and
energy of SNR sub-bands of the current frame;
calculating a tonality signal flag of the current frame according to the frame energy parameter,
the spectral centroid feature, the time-domain stability feature, the spectral flatness feature, and
the tonality feature; and
calculating the VAD decision result according to the tonality signal flag, the SNR parameter,
the spectral centroid feature, and the frame energy parameter.

3. The method according to claim 2, wherein calculating the VAD decision result according to the
tonality signal flag, the SNR parameter, the spectral centroid feature, and the frame energy parameter
comprises:

Signed and Sealed this
Eleventh Day of June, 2024

Katherine Kelly Vidal
*Director of the United States Patent and Trademark Office* acquiring a long-time SNR by computing a ratio of average energy of long-time active frames to average energy of long-time background noise for the previous frame;
acquiring an average total SNR of all sub-bands by calculating an average value of SNR of all sub-bands for a plurality of frames closest to the current frame;
acquiring an SNR threshold for making VAD decision according to the spectral centroid feature, the long-time SNR, the number of continuous active frames and the number of continuous noise frames;
acquiring an initial VAD decision according to the SNR threshold for VAD and the SNR parameter; and
acquiring the VAD decision result by updating the initial VAD decision according to the tonality signal flag, the average total SNR of all sub-bands, the spectral centroid feature, and the long-time SNR.

4. The method according to claim 1, wherein acquiring the number of modified frames for active sound according to the VAD decision result of the current frame, the number of background noise updates and the number of hangover frames for active sound comprises:
when the VAD decision result indicates the current frame is an active frame and the number of background noise updates is less than a preset threshold, the number of modified frames for active sound is selected as a maximum value of a constant and the number of hangover frames for active sound.

5. The method according to claim 1, wherein acquiring the number of hangover frames for active sound comprises:
acquiring a sub-band signal and a spectrum amplitude of the current frame; and
calculating a long-time signal-to-noise ratio (SNR) and an average total SNR of all sub-bands according to the sub-band signal, and obtaining the number of hangover frames for active sound by updating the current number of hangover frames for active sound according to VAD decision results of a plurality of previous frames, the long-time SNR, the average total SNR of all sub-bands, and the VAD decision result of the current frame.

6. The method according to claim 5, wherein updating the current number of hangover frames for active sound to acquire the number of hangover frames for active sound comprises:
if a number of continuous active frames is less than a set first threshold and the long-time SNR is less than a set threshold, the number of hangover frames for active sound is updated by subtracting the number of continuous active frames from the minimum number of continuous active frames; and if the average total SNR of all sub-bands is greater than a set threshold and the number of continuous active frames is greater than a set second threshold, setting a value of the number of hangover frames for active sound according to the value of the long-time SNR.

7. The method according to claim 1, wherein acquiring the number of background noise updates comprises:
acquiring a background noise update flag; and
calculating the number of background noise updates according to the background noise update flag.

8. The method according to claim 7, wherein acquiring the background noise update flag comprises:
acquiring a sub-band signal and a spectrum amplitude of the current frame;
calculating a frame energy parameter, a spectral centroid feature and a time-domain stability feature according to the sub-band signal; and calculating a spectral flatness feature and a tonality feature according to the spectrum amplitude; and
performing background noise detection according to the spectral centroid feature, the time-domain stability feature, the spectral flatness feature, the tonality feature, and the frame energy parameter to acquire the background noise update flag.

9. A method for voice activity detection (VAD), comprising:
acquiring a first VAD decision result;
acquiring a number of hangover frames for active sound;
acquiring a number of background noise updates;
calculating a number of modified frames for active sound according to the first VAD decision result, the number of background noise updates, and the number of hangover frames for active sound;
acquiring a second VAD decision result; and
calculating a VAD decision result according to the number of modified frames for active sound and the second VAD decision result.

10. The method according to claim 9, wherein calculating the VAD decision result according to the number of modified frames for active sound and the second VAD decision result comprises:
when the second VAD decision result indicates that the current frame is an inactive frame and the number of modified frames for active sound is greater than 0, setting the VAD decision result as an active frame, and reducing the number of modified frames for active sound by 1.

11. The method according to claim 9, wherein acquiring the first VAD decision result comprises:
acquiring a sub-band signal and a spectrum amplitude of a current frame;
calculating a frame energy parameter, a spectral centroid feature and a time-domain stability feature of the current frame according to the sub-band signal; and calculating a spectral flatness feature and a tonality feature according to the spectrum amplitude;
calculating a signal-to-noise ratio (SNR) parameter of the current frame according to background noise energy acquired from a previous frame, the frame energy parameter and SNR sub-band energy;
calculating a tonality signal flag of the current frame according to the frame energy parameter, the spectral centroid feature, the time-domain stability feature, the spectral flatness feature, and the tonality feature; and
calculating the first VAD decision result according to the tonality signal flag, the SNR parameter, the spectral centroid feature, and the frame energy parameter.

12. The method according to claim 11, wherein calculating the first VAD decision result according to the tonality signal flag, the SNR parameter, the spectral centroid feature, and the frame energy parameter comprises:
calculating a long-time SNR through a ratio of average energy of long-time active frames and average energy of long-time background noise calculated at the previous frame;

calculating an average value of SNRs of all sub-bands of a plurality of frames closest to the current frame to acquire an average total SNR of all sub-bands;
acquiring a VAD decision threshold according to the spectral centroid feature, the long-time SNR, the number of continuous active frames and the number of continuous noise frames;
calculating an initial VAD decision result according to the VAD decision threshold and the SNR parameter; and
modifying the initial VAD decision result according to the tonality signal flag, the average total SNR of all sub-bands, the spectral centroid feature, and the long-time SNR to acquire the first VAD decision result.

13. The method according to claim 9, wherein acquiring the number of hangover frames for active sound comprises:
acquiring a sub-band signal and a spectrum amplitude of a current frame; and
calculating a long-time signal-to-noise ratio (SNR) and an average total SNR of all sub-bands according to the sub-band signals, and modifying the current number of hangover frames for active sound according to VAD decision results of a plurality of previous frames, the long-time SNR, the average total SNR of all sub-bands, and the first VAD decision result.

14. The method according to claim 13, wherein modifying the current number of hangover frames for active sound comprises:
if the number of continuous voice frames is less than a set first threshold and the long-time SNR is less than a set threshold, the number of hangover frames for active sound being equal to a minimum number of continuous active frames minus the number of continuous active frames; and if the average total SNR of all sub-bands is greater than a set second threshold and the number of continuous active frames is greater than a set threshold, setting a value of the number of hangover frames for active sound according to a size of the long-time SNR.

15. The method according to claim 9, wherein acquiring the number of background noise updates comprises:
acquiring a background noise update flag; and
calculating the number of background noise updates according to the background noise update flag.

16. The method according to claim 15, wherein calculating the number of background noise updates according to the background noise update flag comprises:
when the background noise update flag indicates that a current frame is a background noise and the number of background noise updates is less than a set threshold, adding the number of background noise updates by 1.

17. The method according to claim 15, wherein acquiring the background noise update flag comprises:
acquiring a sub-band signal and a spectrum amplitude of a current frame;
calculating values of a frame energy parameter, a spectral centroid feature and a time-domain stability feature according to the sub-band signal; and calculating values of a spectral flatness feature and a tonality feature according to the spectrum amplitude; and performing background noise detection according to the spectral centroid feature, the time-domain stability feature, the spectral flatness feature, the tonality feature, and the frame energy parameter to acquire the background noise update flag.

18. The method according to claim 9, wherein calculating the number of modified frames for active sound according to the first VAD decision result, the number of background noise updates and the number of hangover frames for active sound comprises:
when the first VAD decision result is an active frame and the number of background noise updates is less than a preset threshold, the number of modified frames for active sound being a maximum value of a constant and the number of hangover frames for active sound.

19. An apparatus for acquiring a number of modified frames for active sound, comprising:
a processor; and
a memory for storing instructions executable by the processor,
wherein the processor is configured to:
acquire a voice activity detection (VAD) decision result of a current frame;
acquire a number of hangover frames for active sound;
acquire a number of background noise updates; and
acquire the number of modified frames for active sound according to the VAD decision result of the current frame, the number of background noise updates and the number of hangover frames for active sound.

20. An apparatus for voice activity detection, comprising:
a processor; and
a memory for storing instructions executable by the processor, wherein the processor is configured to:
acquire a first voice activity detection (VAD) decision result;
acquire a number of hangover frames for active sound;
acquire a number of background noise updates;
calculate a number of modified frames for active sound according to the first VAD decision result, the number of background noise updates, and the number of hangover frames for active sound;
acquire a second VAD decision result; and
calculate a VAD decision result according to the number of modified frames for active sound and the second VAD decision result.